United States Patent
Tomita et al.

(10) Patent No.: US 8,503,721 B2
(45) Date of Patent: Aug. 6, 2013

(54) IMAGE JUDGMENT DEVICE

(75) Inventors: Hiroto Tomita, Fukuoka (JP); Akihiko Inoue, Fukuoka (JP)

(73) Assignee: Panasonic Corporation, Osaka (JP)

( * ) Notice: Subject to any disclaimer, the term of this patent is extended or adjusted under 35 U.S.C. 154(b) by 560 days.

(21) Appl. No.: 12/676,987

(22) PCT Filed: Dec. 12, 2008

(86) PCT No.: PCT/JP2008/003736
§ 371 (c)(1),
(2), (4) Date: Jun. 29, 2010

(87) PCT Pub. No.: WO2009/078155
PCT Pub. Date: Jun. 25, 2009

(65) Prior Publication Data
US 2010/0290669 A1    Nov. 18, 2010

(30) Foreign Application Priority Data
Dec. 14, 2007    (JP) .................................. 2007-322784

(51) Int. Cl.
*G06K 9/00*    (2006.01)
*G06K 9/46*    (2006.01)

(52) U.S. Cl.
USPC .......................................... 382/103; 382/201

(58) Field of Classification Search
USPC ................. 382/100, 103–107, 115, 118, 159,
382/168, 181, 190, 194, 199, 203, 209, 291,
382/218, 298, 282, 201; 342/52, 90, 176;
345/158; 348/152–156, 169–172, 239;
463/36–39; 702/104, 127, 150, 153, 182
See application file for complete search history.

(56) References Cited

U.S. PATENT DOCUMENTS 7,099,510 B2 *   8/2006   Jones et al. .................... 382/225
7,502,493 B2 *   3/2009   Ishida ............................. 382/118
(Continued)

FOREIGN PATENT DOCUMENTS

| JP | 2001-43364 | 2/2001 |
| JP | 2002-358522 | 12/2002 |
| JP | 2003-141444 | 5/2003 |
| JP | 2004-62565 | 2/2004 |
| WO | 2007/029625 | 3/2007 |

OTHER PUBLICATIONS

International Search Report issued Jan. 20, 2009 in International (PCT) Application No. PCT/JP2008/003736.

*Primary Examiner* — Hadi Akhavannik
*Assistant Examiner* — Mehdi Rashidian
(74) *Attorney, Agent, or Firm* — Wenderoth, Lind & Ponack, L.L.P.

(57) ABSTRACT

An image judgment device stores element characteristic information for each element of a characteristic part of a sample object and first and second positional information defining a position of each element, selects the first or the second positional information, and acquires image characteristic information for a partial image in an image frame considered as an element specified by the first positional information based on a first axis. The image judgment device also extracts image characteristic information for a partial image in an image frame considered as an element specified by the second positional information based on a second axis (which is acquired by rotating the first axis), specifies element characteristic information for an element corresponding to a position of the partial image, and judges whether the characteristic part appears in the image frame with use of the specified element characteristic information and the extracted image characteristic information.

17 Claims, 25 Drawing Sheets

U.S. PATENT DOCUMENTS

| | | | |
|---|---|---|---|
| 7,548,651 B2 * | 6/2009 | Shozakai et al. | 382/224 |
| 7,940,965 B2 * | 5/2011 | Ishida | 382/118 |
| 8,300,935 B2 * | 10/2012 | Distante et al. | 382/173 |
| 2002/0181784 A1 * | 12/2002 | Shiratani | 382/218 |
| 2004/0022435 A1 * | 2/2004 | Ishida | 382/190 |
| 2009/0123037 A1 | 5/2009 | Ishida | |

* cited by examiner 90 degrees rotation

Reverse 270 degrees rotation

FIG. 5A
0 degrees
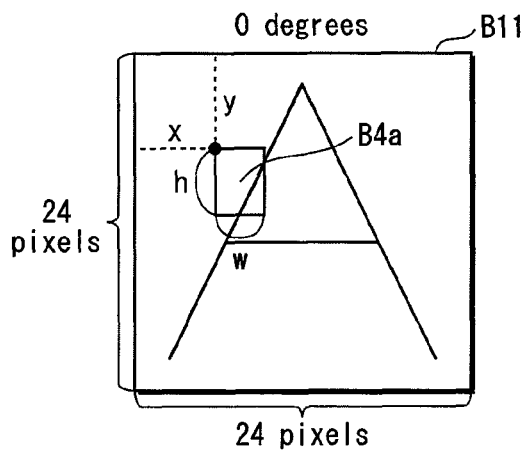
FIG. 5B
90 degrees
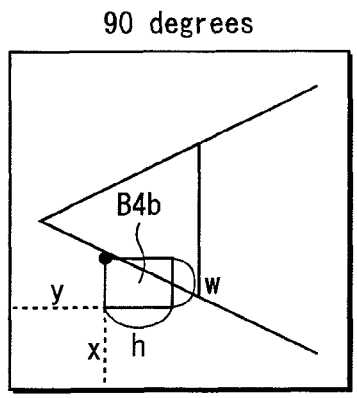
FIG. 5C
Reverse
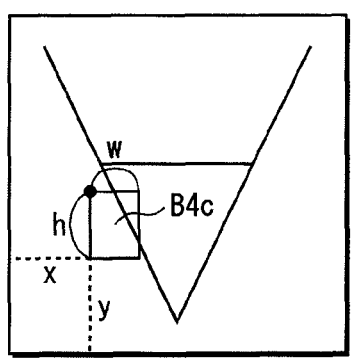
FIG. 5D
270 degrees
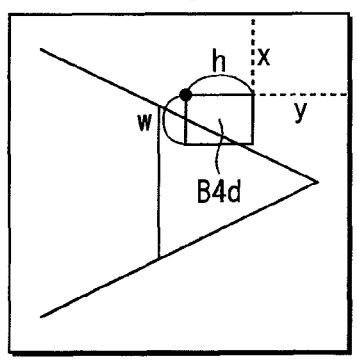
FIG. 5E
| Rotating angle | 0 degrees | 90 degrees | 270 degrees | Reverse |
|---|---|---|---|---|
| X coordinate | x | y | 24-y-h | x |
| Y coordinate | y | 24-x-w | x | 24-y-h |

FIG. 6

Selector table (0 degrees)     ↙T11a

| Window line number | Rectangle information A | | Rectangle information B | |
|---|---|---|---|---|
| | Rectangular image is included or not (0:No, 1:Yes) | X coordinate of rectangular image | Rectangular image is included or not (0:No, 1:Yes) | X coordinate of rectangular image |
| 0 | 0 | 0 | ⋮ | ⋮ |
| 1 | 0 | 0 | ⋮ | ⋮ |
| 2 | 0 | 0 | ⋮ | ⋮ |
| ⋮ | ⋮ | ⋮ | | |
| y_b | 1 | x_b | 1 | x_b' |
| ⋮ | ⋮ | ⋮ | | |
| y_c | 1 | x_b' | ⋮ | ⋮ |
| ⋮ | ⋮ | ⋮ | | |
| 22 | 0 | 0 | | |
| 23 | 0 | 0 | | |

Selector table (90 degrees)     ↙T11b

| Window line number | Rectangle information A | | Rectangle information B | |
|---|---|---|---|---|
| | Rectangular image is included or not (0:No, 1:Yes) | X coordinate of rectangular image | Rectangular image is included or not (0:No, 1:Yes) | X coordinate of rectangular image |
| 0 | 0 | 0 | ⋮ | ⋮ |
| 1 | 0 | 0 | | |
| 2 | 0 | 0 | | |
| ⋮ | ⋮ | ⋮ | | |
| 24-x_b'-4 | 1 | y_c | 1 | y_b |
| ⋮ | ⋮ | ⋮ | | |
| 24-x_b-4 | 1 | y_b | ⋮ | ⋮ |
| ⋮ | ⋮ | ⋮ | | |
| 22 | 0 | 0 | | |
| 23 | 0 | 0 | | |

FIG. 8

Selector table (reverse)      T11c

| Window line number | Rectangle information A | | Rectangle information B | |
|---|---|---|---|---|
| | Rectangular image is included or not (0:No, 1:Yes) | X coordinate of rectangular image | Rectangular image is included or not (0:No, 1:Yes) | X coordinate of rectangular image |
| 0 | 0 | 0 | | |
| 1 | 0 | 0 | | |
| 2 | 0 | 0 | ⋮ | ⋮ |
| ⋮ | ⋮ | ⋮ | | |
| 24-y_c-4 | 1 | x_b' | | |
| ⋮ | ⋮ | ⋮ | | |
| 24-y_b-4 | 1 | x_b | 1 | x_b' |
| ⋮ | ⋮ | ⋮ | ⋮ | ⋮ |
| 22 | 0 | 0 | | |
| 23 | 0 | 0 | | |

FIG. 9

Selector table (270 degrees)      ╱T11d

| Window line number | Rectangle information A | | Rectangle information B | |
|---|---|---|---|---|
| | Rectangular image is included or not (0:No, 1:Yes) | X coordinate of rectangular image | Rectangular image is included or not (0:No, 1:Yes) | X coordinate of rectangular image |
| 0 | 0 | 0 | | |
| 1 | 0 | 0 | | |
| 2 | 0 | 0 | ⋮ | ⋮ |
| ⋮ | ⋮ | ⋮ | | |
| x_b | 1 | 24-y_b-4 | | |
| ⋮ | ⋮ | ⋮ | | |
| x_b' | 1 | 24-y_c-4 | 1 | 24-y_b-4 |
| ⋮ | ⋮ | ⋮ | ⋮ | ⋮ |
| 22 | 0 | 0 | | |
| 23 | 0 | 0 | | |

FIG. 14A  Address conversion table (0 degrees)  T31a

| Window line number | For rectangle information A<br>Output<br>(Offset address) | For rectangle information B<br>Output<br>(Offset address) |
|---|---|---|
| 0 | offset A0 | offset B0 |
| 1 | offset A1 | offset B1 |
| 2 | offset A2 | offset B2 |
| 3 | offset A3 | offset B3 |
| ⋮ | ⋮ | ⋮ |
| y_b | offset An | offset Bn |
| ⋮ | ⋮ | ⋮ |
| y_c | offset Am | offset Bm |
| ⋮ | ⋮ | ⋮ |
| 22 | offset A22 | offset B22 |
| 23 | offset A23 | offset B23 |

FIG. 14B  Address conversion table (90 degrees)  T31b

| Window line number | For rectangle information A<br>Output<br>(Offset address) | For rectangle information B<br>Output<br>(Offset address) |
|---|---|---|
| 0 | offset A0' | offset B0' |
| 1 | offset A1' | offset B1' |
| 2 | offset A2' | offset B2' |
| 3 | offset A3' | offset B3' |
| ⋮ | ⋮ | ⋮ |
| 24-x_b'-4 | offset Am | offset Bn |
| ⋮ | ⋮ | ⋮ |
| 24-x_b-4 | offset An | offset Bm' |
| ⋮ | ⋮ | ⋮ |
| 22 | offset A22' | offset B22' |
| 23 | offset A23' | offset B23' |

FIG. 15A  Address conversion table (Reverse)  T31c

| Window line number | For rectangle information A<br>Output<br>(Offset address) | For rectangle information B<br>Output<br>(Offset address) |
|---|---|---|
| 0 | offset A0" | offset B0" |
| 1 | offset A1" | offset B1" |
| 2 | offset A2" | offset B2" |
| 3 | offset A3" | offset B3" |
| ⋮ | ⋮ | ⋮ |
| 24-y_c-4 | offset Am | offset Bm" |
| ⋮ | ⋮ | ⋮ |
| 24-y_b-4 | offset An | offset Bn |
| ⋮ | ⋮ | ⋮ |
| 22 | offset A22" | offset B22" |
| 23 | offset A23" | offset B23" |

FIG. 15B  Address conversion table (270 degrees)  T31d

| Window line number | For rectangle information A<br>Output<br>(Offset address) | For rectangle information B<br>Output<br>(Offset address) |
|---|---|---|
| 0 | offset A0''' | offset B0''' |
| 1 | offset A1''' | offset B1''' |
| 2 | offset A2''' | offset B2''' |
| 3 | offset A3''' | offset B3''' |
| ⋮ | ⋮ | . |
| x_b | offset An | . |
| ⋮ | ⋮ | . |
| x_b' | offset Am | offset Bn |
| ⋮ | ⋮ | ⋮ |
| 22 | offset A22''' | offset B22''' |
| 23 | offset A23''' | offset B23''' |

0 degrees 90 degrees 270 degrees

Reverse

Normal photographing

⟵——— Zenith direction of input image
⟵----- Zenith direction of subject

Vertical photographing

⟵——— Zenith direction of input image
⟵----- Zenith direction of subject

IMAGE JUDGMENT DEVICE

BACKGROUND OF THE INVENTION

1. Technical Field

The present invention relates to a technology to detect all or part of an object such as a person or a physical object in an image frame to be shot.

2. Background Art

As a conventional technology, there are technologies for detecting an object (e.g. a person, an animal, and a physical object) or a characteristic part (e.g. a face, and an upper body) of the object in the image frame to be shot. As one example of the conventional technologies, there is a technology for detecting a human face in an image frame to be shot by a digital still camera (hereinafter, referred to as "digital camera"),i.e., a face detection technology. The face detection is processing to judge whether or not a face appears in an arbitrary image frame by searching within the arbitrary image frame through certain processing. Such digital camera controls AE (Automatic Exposure)/AF (Automatic Focus) in accordance with a detected face.

Patent documents 1 and 2 disclose an image processing device and a method for detecting a face.

For example, Patent document 1 discloses a method and an image processing device for discriminating a face from an object other than the face (hereinafter, referred to as "non-face"). Characteristic patterns of elements constituting a face (e.g. an eye, a nose, a mouth, and a chin) are preliminarily learned by using samples of a plurality of human faces (sample object), and the discrimination is performed by using element characteristic information composed of a plurality of parameter values which is learned as described above.

A discriminator disclosed in Patent document 1 stores the element characteristic information for each element constituting a face of the sample object in association with a placement position of each element regarding a standard object who has a face in which each element is standardly placed. Also, a plurality of characteristics that each element constituting a face can have are associated with parameter values which are differ from each other and are included in the element characteristic information for each element.

FIG. 22A shows the image processing device disclosed in Patent document 1. In the image processing device, an image cutout unit 33 cuts out, from an input image frame, an image used for judging whether or not a face appears (hereinafter, "judgment image"). As shown in FIG. 22B, the judgment image is cut out by scanning an image frame to be shot, gradually moving a frame 35 of appropriate pixels (e.g. 1 pixel) from the top left to the bottom right of the image frame to be shot in a direction from left to right or from top to bottom.

The image processing device extracts, from the cutout judgment image, a partial image based on a standard placement position of each element, and judges whether or not a face appears in the judgment image with use of (i) the element characteristic information for an element whose position corresponds to the placement position of the partial image and (ii) characteristics of the extracted partial image.

Patent document 1: U.S. Pat. No. 7,099,510, Specification
Patent document 2: Japanese Patent Application publication No. 2004-62565

SUMMARY OF THE INVENTION

Generally, since a photographer takes a picture with a digital camera held in a manner shown in a left drawing of FIG. 24A (normal photographing), an image, as shown in a right drawing of FIG. 24A, in which a zenith direction of a person (an object) corresponds to an upper direction of an input image is used as an input image targeted for the face detection. However, when the photographer takes a picture with the digital camera held in a manner shown in a left drawing of FIG. 24B (vertical photographing), an image, as shown in a right drawing of FIG. 24B, in which the zenith direction of a person does not correspond to the upper direction of an input image is used as the input image targeted for the face detection. Hereinafter, the image in which the zenith direction of an object corresponds to the upper direction of an input image is referred to as a normal image, whereas the image in which they do not correspond with each other is referred to as a rotated image.

Here, in order to perform the face detection for the normal image and the rotated image by using the technology disclosed in Patent document 1, the discriminator is required to prepare (store) sample characteristic information for each of the normal image and the rotated image.

The reason is that (i) a position and a direction of elements (right eye, left eye, and left side chin) constituting a face at the normal photographing shown in FIG. 25A and (ii) a position and a direction of these elements constituting a face at a rotated photographing shown in FIG. 25B differ from each other, and thereby characteristics of elements at the normal photographing and characteristics of elements at the rotated photographing differ from each other. For example, the left eye (here, a rectangular area R_B1) is placed laterally at the normal photographing, whereas the left eye is placed vertically at the rotated photographing, and characteristics of the lateral eye and the vertical eye differ from each other.

Generally, numerous parameter values are associated with one element. For example, the eye has various patterns of characteristics (e.g. shape of the eye, size thereof, color thereof, a single-edged eyelid, a double-edged eyelid, with glasses/without glasses, and the opened eye/closed eye). Therefore, parameter values for various combinations of these patters are required to be stored. Accordingly, as described above, in order to perform the face detection for the normal image and the rotated image by using the technology disclosed in Patent document 1, it is necessary to store element characteristic information for the normal image and that for the rotated image separately. This leads to a problem that a storage capacity of a storage area is increased.

The present invention was conceived in view of the above problem, and aims to provide an image judgment device, an image judgment method, and an integrate circuit capable of preventing increase in the storage capacity to store the element characteristic information that is used for judging whether or not a characteristic part of an object appears in the normal image or the rotated image.

In order to achieve the above object, embodiment 1 of the present invention is an image judgment device for judging whether or not a characteristic part of an object appears in an image frame to be shot, the characteristic part being a distinguishing aspect of the object and having a plurality of specific elements, the judgment being made by using the plurality of specific elements, the image judgment device comprising: a first storage unit that stores element characteristic information regarding an erected-state sample object, the element characteristic information showing characteristics of each of a plurality of specific elements that a characteristic part of the sample object has; a second storage unit that stores first positional information and second positional information, the first positional information defining a position of each of a plurality of specific elements on a specific coordinate system when a standard object is in the same state as the erected-state sample object, the second positional information defining a position of each of the specific elements on the specific coordinate system when the standard object has been rotated from the erected-state, the standard object having a characteristic part on which each of the specific elements is standardly placed; an acquisition unit operable to acquire the image frame; a selection unit operable to select either the first positional information or the second positional information; an extraction processing unit operable to (i) apply the specific coordinate system to the image frame, (ii) when the first positional information is selected, extract a partial image that is in the image frame and considered as an element specified by the first positional information, and acquire image characteristic information for the partial image by applying a characteristic extraction method based on a first axis on the specific coordinate system, and (iii) when the second positional information is selected, extract a partial image that is in the image frame and considered as an element specified by the second positional information, and acquire image characteristic information for the partial image by applying a characteristic extraction method based on a second axis, the second axis being acquired by rotating the first axis in a direction the object is rotated; and a judgment unit operable to (i) specify the element characteristic information for a specific element at a position corresponding to a position of the partial image on the specific coordinate system, (ii) evaluate, for the specific element, the partial image with use of the specified element characteristic information and the acquired image characteristic information, and (iii) judge whether or not the characteristic part having the specific element appears in the image frame.

With the above-mentioned structure, the image judgment device acquires, when the first positional information is selected, the image characteristic information in the characteristic extraction method based on the first axis, and acquires, when the second positional information is selected, the image characteristic information in the characteristic extraction method based on the second axis. Here, the image judgment device stores the element characteristic information regarding the erected-state sample object. When the first positional information is selected, the image characteristic information is acquired for a partial image considered as the element specified by positional information when the standard object is in the same state as the erected-state sample object. Accordingly, the image judgment device can use the stored element characteristic information and the acquired image characteristic information to evaluate a partial image when the object is in the same state as the erected-state sample object. Generally, when the standard object is rotated, a direction of specific elements that the characteristic part of the standard object has is changed in accordance with a direction of rotation. Ditto a direction of the extracted partial image and an axis being a basis to acquire the image characteristic information. A direction of the partial image considered as an element specified by the second positional information is acquired by changing a direction of the partial image considered as an element specified by the first positional information in accordance with a direction of rotation. Also, the second axis is acquired by rotating the first axis in accordance with a direction of rotation. Therefore, a relative relationship between the partial image considered as an element specified by the first positional information and the first axis, and a relative relationship between the partial image considered as an element specified by the second positional information and the second axis are the same. Since these relative relationships are the same, the image characteristic information acquired when the first positional information is selected and the image characteristic information acquired when the second positional information is selected are the same in configuration to show characteristics. Accordingly, the element characteristic information stored in the first storage unit can be also used for the image characteristic information acquired when the second positional information is selected. Consequently, the image judgment device does not have to separately store (i) the element characteristic information for an element specified by the first positional information and (ii)) the element characteristic information for the element specified by the second positional information. Even when judging whether or not the characteristic part of the object appears in a rotated image, the image judgment device can prevent increase in a storage capacity to store the element characteristic information used for the judgment.

Here, the acquisition unit may apply a frame surrounding the characteristic part of the standard object to the image frame, and acquire a judgment image surrounded by the frame from the image frame, the extraction processing unit may acquire a partial image that is in the judgment image and considered as an element specified by selected positional information, and extract image characteristic information for the partial image, and the judgment unit may (i) evaluate, for the specific element, the partial image with use of the specified element characteristic information and the extracted image characteristic information, and (ii) judge whether or not the characteristic part appears in the judgment image.

With the above-mentioned structure, the image judgment device can judge whether or not the characteristic part appears in the judgment image in the image frame.

Here, the image judgment device may further comprise: an instruction unit operable to, when the judgment unit judges that the characteristic part does not appear in the judgment image, instruct the selection unit to select another piece of positional information which has not been selected, wherein the selection unit selects the other piece of positional information which has not been selected upon receiving the instruction, the extraction processing unit extracts another partial image that is considered as an element specified by the selected other piece of positional information, and acquires image characteristic information for the other partial image by applying a characteristic extraction method based on an axis corresponding to the selected other piece of positional information, and the judgment unit (i) specifies the element characteristic information for a specific element at a position corresponding to a position of the extracted other partial image on the specific coordinate system (ii) evaluates, for the specific element, the other partial image with use of the specified element characteristic information and the extracted image characteristic information, and (iii) judges whether or not the characteristic part appears in the image frame.

With the above-mentioned structure, when judging that the characteristic part of the object does not appear in the judgment image, the image judgment device switches a piece of positional information to another piece of positional information which has not been selected. This shorten the processing time in comparison with a conventional technology in which whether or not a particular part appears is judged by rotating a template itself or the image frame itself. The technology to judge whether or not the particular part appears by rotating the template itself or the image frame itself is disclosed in Patent Document 2.

Here, the extraction processing unit may comprise: an image read sub-unit that has an area in which line images of predetermined lines in the judgment image are stored, and operable to (i) sequentially read a line image of a line from the judgment image, (ii) sequentially store the read line image in the area, and (iii) discard, from the area, a line image having been read first when the number of the stored line images exceeds the number of the predetermined lines; and an extraction sub-unit operable to, each time the image read sub-unit reads and stores the line image, (i) extract all partial images that are in the line images stored in the image read sub-unit and considered as elements specified by selected positional information, and (ii) acquire image characteristic information for all the extracted partial images, and the judgment unit may comprise: a specification sub-unit operable to, each time the extraction sub-unit extracts the partial image, specify element characteristic information for the partial image; and a judgment sub-unit operable to judge whether or not the characteristic part appears in the judgment image with use of the acquired image characteristic information and the specified element characteristic information for all the acquired partial images.

With the above-mentioned structure, the image judgment device extracts, at a time when the line images are read, all partial images in the stored line images, and specifies the element characteristic information for each of the extracted partial images. This can prevent a processing capacity to judge whether or not the characteristic part of the object appears from being decreased even when the object to be detected is rotated.

The reason is described as follows.

In the conventional technology, as shown in FIG. 22A, processing order for the partial image is preliminarily determined. For example, the processing is performed with respect to the eye, nose, and mouth, in this order. Generally, since the judgment image surrounded by the frame 35 is stored in a SRAM (Static Random Access Memory), the judgment image is required to be sequentially read from the top thereof line by line. In other words, the partial image (a rectangular image in the conventional technology) is cut out in parallel with the reading of the judgment image which is performed line by line, and an evaluation of an amount of characteristic for the cutout partial image is performed with use of a parameter with respect to the partial image evaluated by a characteristic amount evaluation unit. For example, as shown in FIG. 25A, in the case where the processing is performed with respect to the eyes (a rectangular image R_A1 and R_B1), and the chin (a rectangular image R_A2), in this order, when a line image on a$1^{th}$ line is read, the rectangular images (R_A1 and R_B1) are selected, and an evaluation for the rectangular images with respect to the eye is performed in parallel. Then, the rectangular image (R_A2) is selected, and an evaluation for the rectangular image with respect to the chin is performed. On the other hand, in the case of an image shown in FIG. 25B, when performing face detection, an evaluation with respect to the eyes is performed first based on an evaluation order. In this case, when an image of one line on b$1^{th}$ line shown in FIG. 25B is read, an evaluation for the rectangular image R_B1 with respect to the eye is performed, and then when an image of one line on b$2^{th}$ line is read, an evaluation for the rectangular image R_A1 with respect to the eye is performed. Then, an evaluation for the rectangular image R_A2 with respect to the chin is performed based on the evaluation order. That is to say, in the conventional technology, when a line image on b$1^{th}$ line in the rotated image is read, only an evaluation for the rectangular image R_B1 is performed. In other words, an evaluation for the rectangular image R_B1 and that for the rectangular image R_A2 can not be performed in parallel. Accordingly, the processing capacity to judge whether or not the characteristic part appears in the rotated image is decreased compared with a processing capacity to judge whether or not the characteristic part appears in a normal image. However, the image judgment device in the present invention acquires the element characteristic information for each of the extracted partial images at a time when the line image is read regardless of positional information to be selected. The image judgment device having the above structure can perform processing using the element characteristic information for the rectangular image R_B1 in FIG. 25 and processing using the element characteristic information for the rectangular image R_A1 in FIG. 25 in parallel. Therefore, the image judgment device can prevent a processing capacity to judge whether or not the characteristic part of the object appears from being decreased even when the object to be detected is rotated.

Here, the first positional information may be shown in a first placement position table indicating a placement position of each of the specific elements that the characteristic part of the standard object has on the specific coordinate system when the standard object is in the same state as the erected-state sample object, the second positional information may be shown in a second placement position table indicating a placement position of each of the specific elements that the characteristic part of the standard object has on the specific coordinate system when the standard object has been rotated from the erected-state, the second storage unit may further store (i) a first existence position table in which the placement position of each of the specific elements when the standard object is in the same state as the erected-state sample object is associated with an existence position of element characteristic information for each of the specific elements in the first storage unit, and (ii) a second existence position table in which the placement position of each of the specific elements when the object has been rotated from the erected-state is associated with the existence position of the element characteristic information for each of the specific elements, the selection unit may select either a pair of the first placement position table and the first existence position table or a pair of the second placement position table and the second existence position table, the extraction sub-unit may extract the partial image with use of a placement position table included in the pair selected by the selection unit, and the specification sub-unit may specify the element characteristic information for the partial image with use of positional information having been used to extract the partial image and an existence position table selected by the selection unit.

With the above-mentioned structure, by using the pair of the first placement position table and the first existence position table and the pair of the second placement position table and the second existence position table stored in the second storage unit, the image judgment device can manage the first and second positional information, associate the first positional information with the element characteristic information, and associate the second positional information with the element characteristic information.

Here, shape information showing a shape of a partial image to be acquired may be associated with the placement position of each of the specific elements included in each of the first placement position table and the second placement position table, the extraction sub-unit may extract a partial image that is at the placement position of each of the specific elements from the stored line images, the partial image having a shape shown by the shape information corresponding to the placement position.

With the above-mentioned structure, the image judgment device can specify the shape of the partial image to be extracted.

Here, the element characteristic information may be an evaluation value group composed of evaluation values having been weighted in terms of an approximation to a corresponding specific element, each amount of characteristic shown by a combination of brightness and darkness in a plurality of areas constituting the partial image may be associated with a different sample value, the existence position included in the existence position table may show a starting position of a corresponding sample value group in the first storage unit, the extraction sub-unit may acquire, as the image characteristic information, the amount of characteristic of the partial image by applying a characteristic extraction method based on an axis corresponding to the selected positional information, the specification sub-unit may specify, each time the extraction sub-unit extracts the partial image, a starting position of the evaluation value group with use of the selected existence position table and the placement position having been used to extract the partial image, the judgment sub-unit may (i) acquire an evaluation value corresponding to the amount of characteristic of the partial image from the evaluation value group shown by the specified starting position, (ii) calculate a weighted value in terms of an approximation to the characteristic part from a total of the acquired evaluation values for all the partial images in the judgment image, and (iii) judge that the characteristic part appears in the judgment image when the calculated weighted value is a predetermined threshold value or more.

With the above-mentioned structure, the image judgment device can specify the starting position of the evaluation value group for each of the extracted partial images with use of the existence position table selected by the selection unit. And it can acquire, for each of the extracted partial image, the evaluation value corresponding to the amount of characteristic for the acquired partial image from the evaluation value group shown by the specified starting position. Further also the image judgment device can calculate a weighted value in terms of an approximation to the characteristic part with use of a total of the acquired evaluation values for all the partial images extracted from the judgment image, and judge whether or not the characteristic part appears in the judgment image based on the calculated weighted value.

Here, the second storage unit may further store, (i) in association with the first placement position table and the first existence position table, a first placement position table use flag and a first existence position table use flag, respectively, showing whether or not each of the tables can be used and, (ii) in association with the second placement position table and the second existence position table, a second placement position table use flag and a second existence position table use flag, respectively, showing whether or not each of the tables can be used, the selection unit may further set a value for a placement position table use flag and an existence position table use flag corresponding to a pair of the placement position table and the existence position table to be selected, the value showing that the corresponding placement position table and existence position table are permitted to be used, the extraction sub-unit may use the placement position table for which the value showing that the placement position table is permitted to be used is set to extract the partial image, and the specification sub-unit may use the existence position table for which the value showing that the existence position table is permitted to be used is set to specify the element characteristic information.

Also, the second storage unit may have a referable area and a non-referable area, the selection unit may store a pair of the placement position table and the existence position table to be selected in the referable area, and the other pairs of the placement position table and the existence position table in the non-referable area, the extraction sub-unit may use the placement position table stored in the referable area to extract the partial image, and the specification sub-unit may use the existence position table stored in the referable area to specify the element characteristic information.

Further also, an access right may be associated with each of the first placement position table, the second placement position table, the first existence position table, and the second existence position table, the access right showing whether or not each of the tables can be accessed, the selection unit may set (i) an access right for a pair of the placement position table and the existence position table to be selected, the access right showing that the corresponding placement position table and existence position table are permitted to be accessed, and (ii) an access right for pairs of the other placement position tables and existence position tables, the access right showing that the corresponding placement position tables and existence position tables are not permitted to be accessed, the extraction sub-unit may use the placement position table for which the access right showing the placement position table is permitted to be accessed is set to extract the partial image, and the specification sub-unit may use the existence position table for which the access right showing the existence position table is permitted to be accessed is set to specify the element characteristic information.

With the above-mentioned structure, the image judgment device can easily switch pairs of the placement position table and the existence position table to be selected with use of the use flag for each table, the referable area and the non-referable area, and the access right for each table.

Here, the selection unit may receive an instruction to select either the first or second positional information from the outside, and select positional information shown by the received instruction.

With the above-mentioned structure, the image judgment device can easily select either the first positional information or the second positional information by receiving the instruction from the outside.

Here, the object may be rotated 90 degrees, 180 degrees, 270 degrees, or reversed.

With the above-mentioned structure, since the image judgment device stores the second positional information corresponding to one of the rotations of 90 degrees, 180 degrees, 270 degrees, and reverse, there is no need to rotate the template itself or the image frame itself 90 degrees, 180 degrees, 270 degrees, or reverse as disclosed in the conventional technology. This shorten the processing time in comparison with the conventional technology in which whether or not a particular part appears is judged by rotating the template itself or the image frame itself.

Here, the object may be a person, and the characteristic part may be a face.

With the above-mentioned structure, the image judgment device can prevent increase in a storage capacity to store the element characteristic information used to judge whether or not a human face appears in the image frame to be shot regardless of rotation.

Here, the image judgment device may be included in an imaging device shooting the object.

With the above-mentioned structure, since the image judgment device is included in the imaging device, the imaging device can judge whether or not the characteristic part of the object appears when shooting the object.

BRIEF DESCRIPTION OF THE DRAWING

FIG. 5A shows a coordinate of a rectangular image area to be selected at a standard angle (0 degrees). FIGS. 5B, C, and D show coordinates of rectangular image areas to be selected at rotating angles (90 degrees, reverse, and 270 degrees, respectively). FIG. 5E shows a relationship among coordinates of start positions of rectangular image areas to be selected at respective angles.

FIG. 6 shows an example of a data structure of a selector table T11a at a rotating angle 0 degrees.

FIG. 7 shows an example of a data structure of a selector table T11b at a rotating angle 90 degrees.

FIG. 8 shows an example of a data structure of a selector table T11c at a reverse angle.

FIG. 9 shows an example of a data structure of a selector table T11d at a rotating angle 270 degrees.

FIG. 14A shows an example of a data structure of an address conversion table T31a at a rotating angle 0 degrees. FIG. 14B shows an example of a data structure of an address conversion table T31b at a rotating angle 90 degrees.

FIG. 15A shows an example of a data structure of an address conversion table T31c at a reverse angle. FIG. 15B shows an example of a data structure of an address conversion table T31d at a rotating angle 270 degrees.

FIG. 19 is a block diagram showing a structure of an image processing device 1a.

Figure 1:
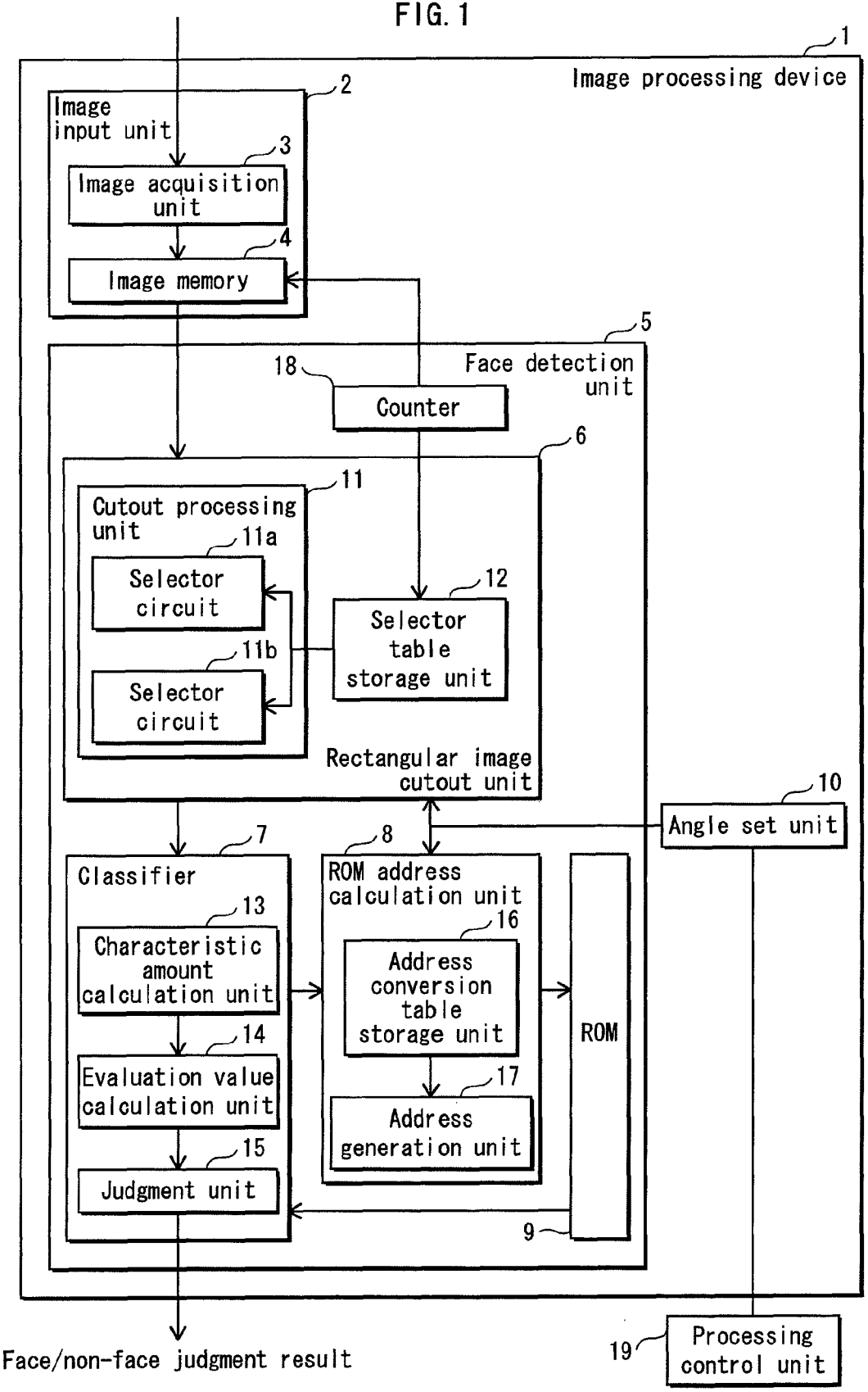
FIG. 1 is a block diagram showing a structure of an image processing device 1.

DESCRIPTION OF CHARACTERS 1 image processing device
2 image input unit
3 image acquisition unit
4 image memory
5 face detection unit
6 rectangular image cutout unit
7 classifier
8 ROM address calculation unit
9 ROM
10 angle set unit
11 cutout processing unit
11a, 11b selector circuit
12 selector table storage unit
13 characteristic amount calculation unit
14 evaluation value calculation unit
15 judgment unit
16 address conversion table storage unit
17 address generation unit
18 counter
19 processing control unit

DETAILED DESCRIPTION OF THE INVENTION

1. Embodiment 1

The following describes embodiment 1 of the present invention with reference to the drawings.

1.1 Structure of an Image Processing Device 1

FIG. 1 is a block diagram showing an image processing device 1 in embodiment 1.

As shown in FIG. 1, the image processing device 1 includes an image input unit 2, a face detection unit 5, and an angle set unit 10. The image processing device 1 is an image judgment device for judging whether or not a human face appears in an input image frame.

Specifically, the image processing device 1 is a computer system that is composed of a micro processor, a ROM, a RAM, a hard disc unit, and the like. A computer program is stored in the RAM or the hard disc unit. As the micro processor operates in accordance with the computer program, the image processing device 1 achieves its functions. Here, the computer program is constituted from a plurality of instruction codes combined with each other to achieve a predetermined function, the instruction codes showing commands for a computer.

(1) Image Input Unit 2

As shown in FIG. 1, the image input unit 2 includes an image acquisition unit 3 and an image memory 4.

The image acquisition unit 3 includes an interface circuit for acquiring image data (input image data) to be shot and so on.

Figure 2:
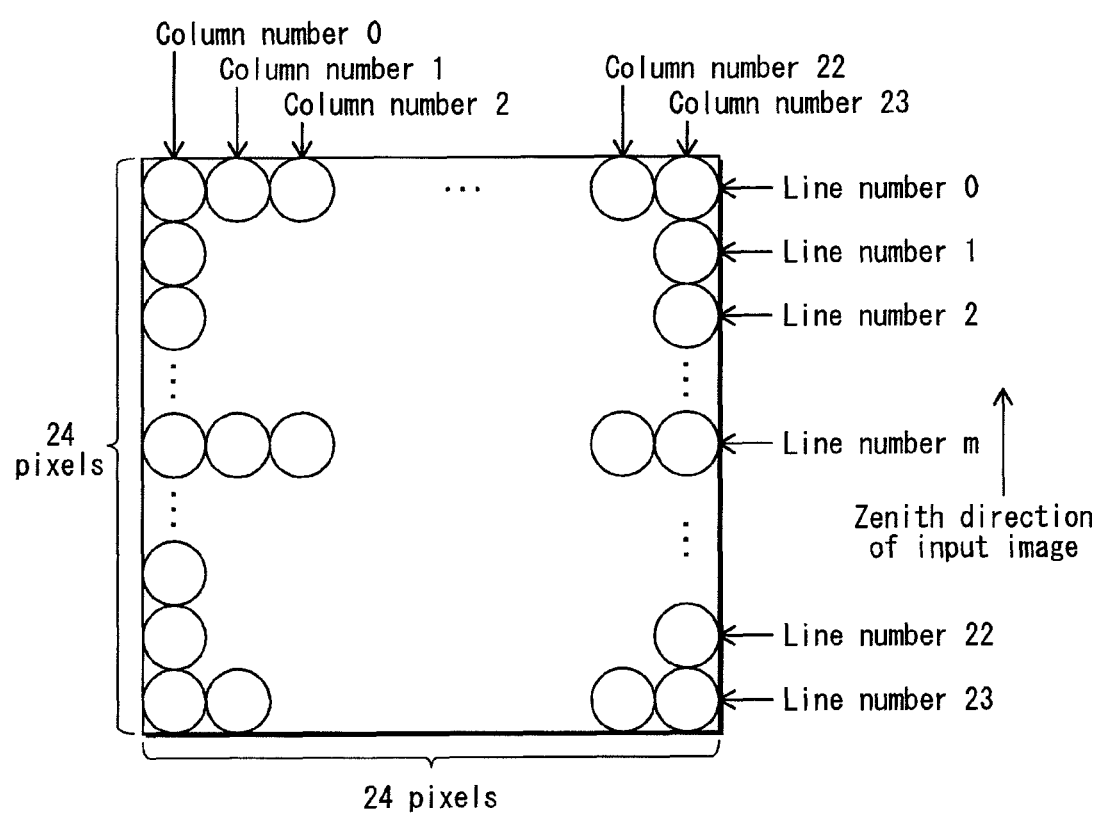
FIG. 2 schematically shows an image stored in an image memory 4.

The image memory 4 stores the acquired image data. Specifically, the image memory 4 is composed of a SRAM, and has a 24 word structure in which pixel data of one line (i.e. data of 24 pixels, here) is stored in one word. In other words, image data acquired by the image acquisition unit 3 is once stored in the image memory 4 in a unit in which the face detection unit 5 performs processing, i.e., 24 pixels×24 pixels as shown in FIG. 2. Hereinafter, the unit in which the face detection unit 5 performs processing (e.g. 24 pixels×24 pixels) is referred to as a window. Pixel data of one window is stored in the image memory 4.

Based on a size of a window, the image acquisition unit 3 scans an input image to be shot by gradually moving appropriate pixels (e.g. 1 pixel) from the top left to the bottom right of the input image in a direction from left to right or from top to bottom, and acquires pixel data of a window to store in the image memory 4.

The pixel data stored in the image memory 4 is output to the face detection unit 5 in units of line (here, pixel data of 24 pixels) in response to a request from the face detection unit 5.

Here, the image memory 4 needs to have only a capacity of one window. However, the capacity is not limited to this. The image memory 4 may have a capacity larger than one window to store pixel data acquired by the image acquisition unit 3 and output pixel data to the face detection unit 5 in parallel so that a delay in acquisition of the pixel data can be concealed.

Note that a size of a window, i.e., 24 pixels×24 pixels here and a structure of the SRAM are just examples, and not limited to these. A window of another size may be used, and the image memory 4 may be a storage unit other than the SRAM.

(2) Face Detection Unit 5

As shown in FIG. 1, the face detection unit 5 includes a counter 18, a rectangular image cutout unit 6, a classifier 7, a ROM address calculation unit 8, and a ROM 9.

(2-1) Counter 18

The counter 18 counts up from 0 to 23 and specifies a line in the image memory 4 to be read according to a counter value.

The counter value of the counter 18 is output to the image memory 4 as an address to read out all pieces of pixel data of one window stored in the image memory 4. At this time, image data of 24 pixels on a line whose number is the same as a value shown by the counter 18 is output from the image memory 4 to the face detection unit 5. For example, when a value of the counter 18 is 15, pixel data of 24 pixels on $15^{th}$ line is output to the face detection unit 5.

The counter value of the counter 18 is also output to the rectangular image cutout unit 6 as a line number in a window to be read in.

(2-2) Rectangular Image Cutout Unit 6

As shown in FIG. 1, the rectangular image cutout unit 6 includes a cutout processing unit 11 and a selector table storage unit 12. The rectangular image cutout unit 6 cuts out a rectangular image from image data of a window output from the image input unit 2.

The selector table storage unit 12 is a storage area that stores information about a cutout position of a rectangular image.

The cutout processing unit 11 selects (cuts out) image data of a rectangular image (hereinafter, also referred to as "rectangular image data") based on one of selector tables.

(2-2-1) Cutout Processing Unit 11

As shown in FIG. 1, the cutout processing unit 11 includes selector circuits 11a and 11b.

The selector circuits 11a and 11b read out, from the image memory 4, pixel data of one line in a window on a line whose number is the same as a counter value of the counter 18. Here, all pieces of data in the window are input to the rectangular image cutout unit 6 through 24 cycles.

The selector circuits 11a and 11b select a rectangular image at a predetermined position based on the information stored in the selector table storage unit 12.

Figure 3:
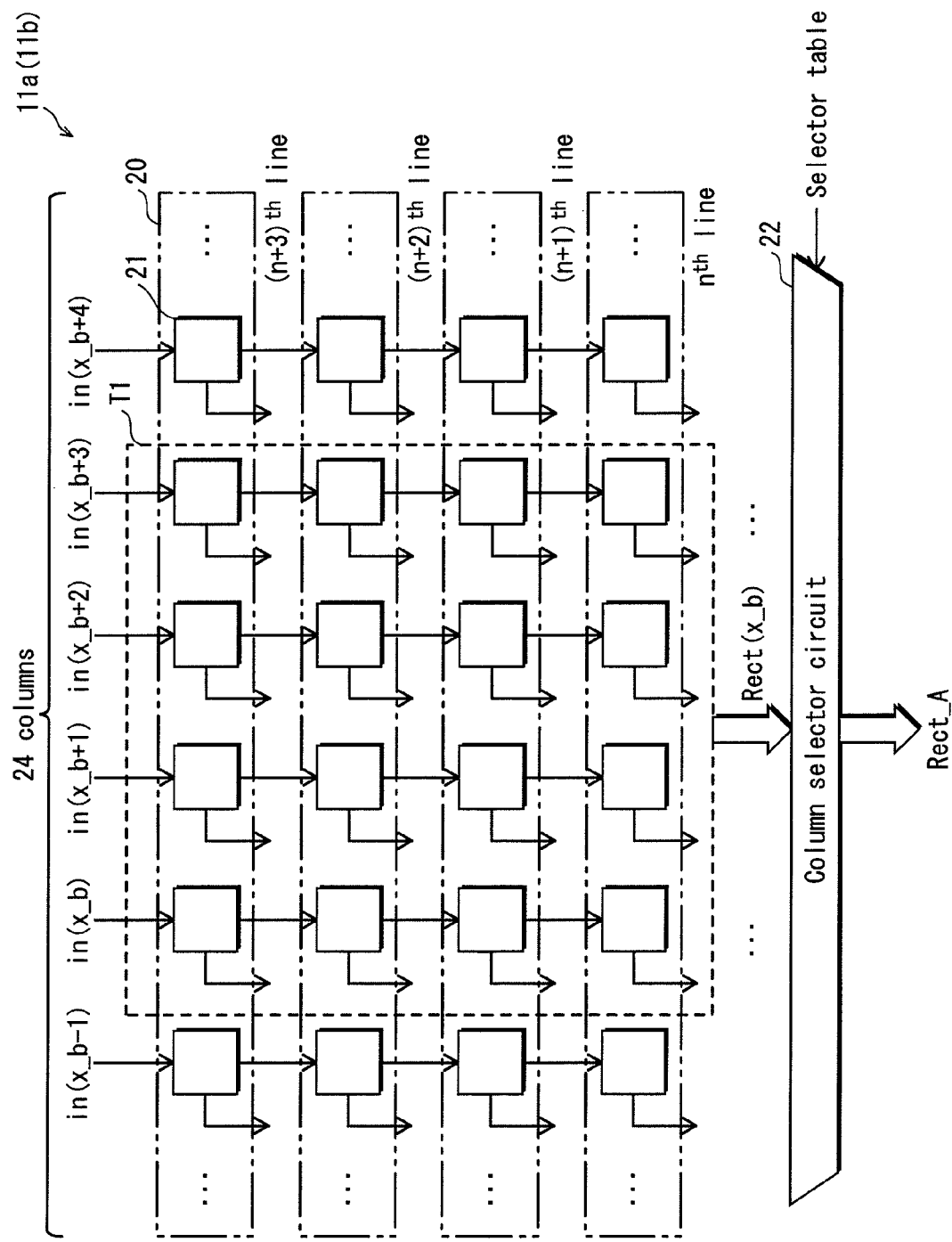
FIG. 3 shows a structure of selector circuits 11a and 11b.

A circuit diagram of the selector circuit 11a (11b) is shown in FIG. 3. The selector circuit 11a includes a register 21 for storing data of one pixel, a shift register group 20 being composed of a plurality of the registers 21 (here, 24 registers), and a column selector circuit 22.

The selector circuit 11a needs to store pixel data of a rectangular image, because the classifier 7 (described later) performs processing of one rectangular image at a time. A buffer to store the pixel data of a rectangular image is composed of the shift register group 20. By including four tiers of the shift register group 20 in FIG. 3, a rectangular image with a height of 4 pixels can be processed. The pixel data of a rectangular image stored in the shift register group 20 is selected by the column selector circuit 22 based on the information stored by the selector table storage unit 12, and output to the classifier 7.

Note that explanations about the selector circuit 11b are omitted here, because the structure of the selector circuit 11b is the same as that of the selector circuit 11a.

The selector circuits 11a and 11b can read out pieces of pixel data on the same line whose number is the same as a value shown by the counter 18 at one time. When there are two rectangular images on the same line, two pieces of rectangular image data can be selected at one time by using both of the selector circuits 11a and 11b.

(2-2-2) Selector Table Storage Unit 12

The selector table storage unit 12 stores information showing a position of rectangular image data to be cut out by the selector circuits 11a and 11b. Here, suppose that 4 pixels×4 pixels rectangular images B1, B2, and B3 shown in FIGS. 4A to 4D are to be selected (cutout). In the following, explanations are made by using template frames shown in FIGS. 4A to 4D and rectangular images.

Figure 4A:
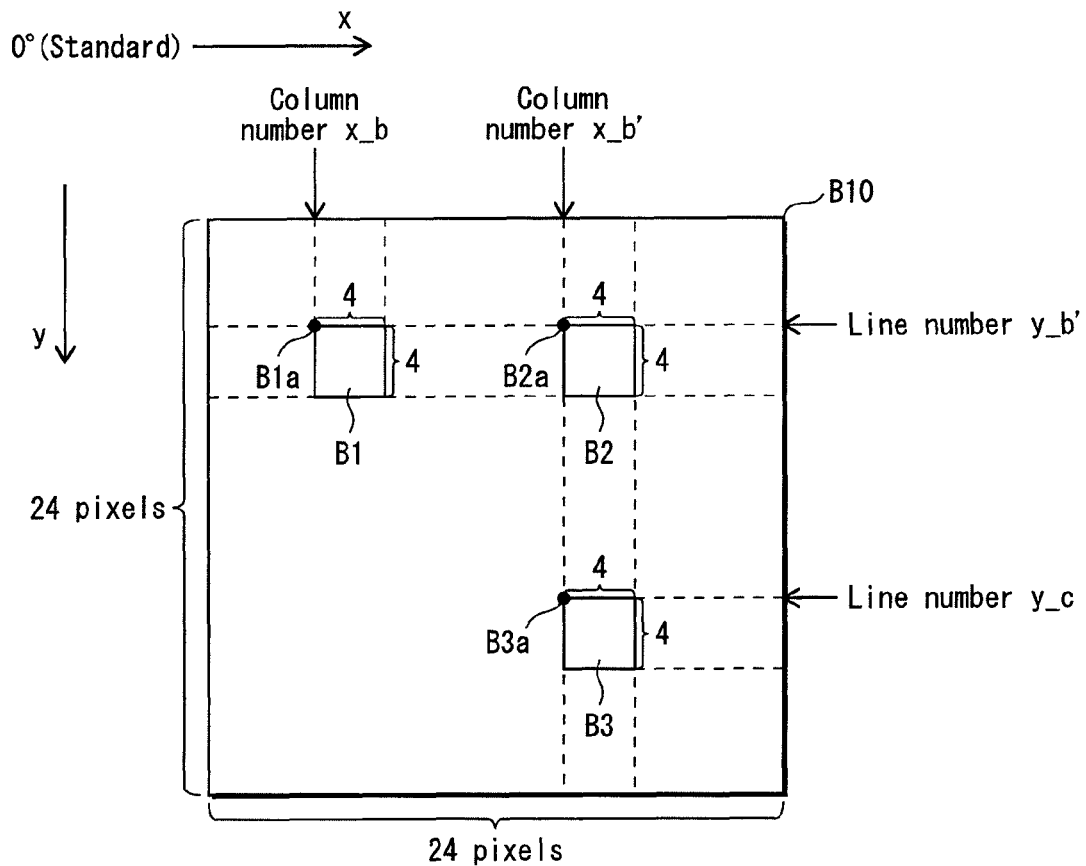
FIG. 4A shows rectangular image areas to be selected at a standard angle (0 degrees).

The selector table storage unit 12 stores information about start positions B1a, B2a, and B3a of rectangular images B1, B2, and B3, respectively, to be selected based on a template frame B10 shown in FIG. 4A. A size of the template frame B10 is 24 pixels vertical×24 pixels horizontal, and it is the same as a size of a window stored in the image memory 4. Note that, in a case where a human face appears in the template frame B10, rectangular images B1, B2, and B3 are placed on standard placement positions of the right eye, left eye, and left side chin, respectively.

Also, the selector table storage unit 12 stores start positions of rectangular images B1, B2, and B3, respectively, when the template frame B10 shown in FIG. 4A is rotated 90 degrees and 270 degrees in a counterclockwise direction. Here, the selector table storage unit 12 stores start positions B1b, B2b, and B3b shown in FIG. 4B and start positions B1d, B2d, and B3d shown in FIG. 4D. Further also, the selector table storage unit 12 stores start positions of rectangular images B1, B2, and B3, respectively, when the template frame B10 shown in FIG. 4A is reversed. Here, the selector table storage unit 12 stores start positions B1c, B2c, and B1c shown in FIG. 4C.

FIG. 5 shows a relationship between a rectangular image and a rotating angle. Here, suppose that an X-coordinate and a Y-coordinate of a start position of a rectangular image B4a with h pixels×w pixels in a template frame B11 at a standard angle (0 degrees) is shown as (x, y). In this case, when the template B11 is rotated 90 degrees in a counterclockwise direction, the rectangular image B4a is moved to a position shown by a rectangular image B4b, and an X-coordinate of its start position is y and a Y-coordinate thereof is 24-x-w as shown in FIG. 5B. When the template frame B11 is reversed, or rotated 270 degrees in a counterclockwise direction, the rectangular image B4a is moved to positions shown by rectangular images B4c or B4d, respectively, as shown in FIGS.

5C and 5D. A relationship between a coordinate position at a standard angle and coordinate positions after being rotated or reversed is shown in FIG. 5E.

The following describes a specific example of how information about a rectangular image to be selected is stored in the selector table storage unit 12.

The selector table storage unit 12 stores four kinds of selector tables T11a, T11b, T11c, and T11d shown in FIGS. 6 to 9.

Each of the selector tables T11a, T11b, T11c, and T11d is composed of an area which includes at least one combination of a window line number, rectangle information A, and rectangle information B.

The window line number is a value showing a line number in a window.

Each of the rectangle information A and the rectangle information B is composed of information about whether or not a rectangular image is included, and an X-coordinate of the rectangular image.

Specifically, the information about whether or not a rectangular image is included is a rectangular image flag which is set to a value 0 or 1. When the value of the rectangular image flag is set to 0, there is no rectangular image whose Y-coordinate of a start position is the same as a corresponding line number. In contrast, when the value of the rectangular image flag is set to 1, there is a rectangular image whose Y-coordinate of a start position is the same as a corresponding line number.

The X-coordinate of the rectangular image shows an X-coordinate of a start position of an existing rectangular image, when the information about whether or not a rectangular image is included, that is to say, a value of the rectangular image flag is set to 1.

Here, an X-coordinate and a Y-coordinate of a start position of the existing rectangular image is specified by the window line number and the X-coordinate of the rectangular image.

The selector table T11a shown in FIG. 6 shows information pertaining to rectangular images in FIG. 4A, that is, at a standard angle (0 degrees). It shows that there are two rectangular images corresponding to a window line number "y_b" and one rectangular image corresponding to a window line number "y_c". In this case, a rectangular image B1 shown in FIG. 4A is specified by the window line number "y_b" and an X-coordinate of a rectangular image "x_b", and a rectangular image B2 shown in FIG. 4A is specified by the window line number "y_b" and an X-coordinate of a rectangular image "x_b". Also, a rectangular image B3 shown in FIG. 4A is specified by the window line number "y_c" and the X-coordinate of a rectangular image "x_b'".

Figure 4B:
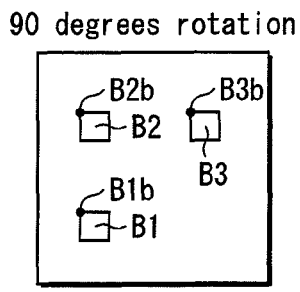
FIGS. 4B, C, and D show rectangular image areas to be selected at rotating angles (90 degrees, reverse, and 270 degrees, respectively).
Figure 4C:
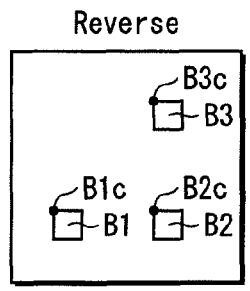
Figure 4D:
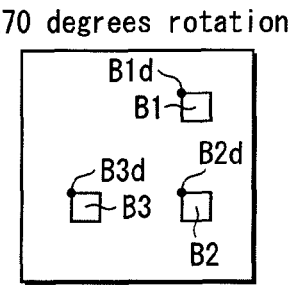

Each of the selector tables T11b, T11c, and T11d shown in FIGS. 7 to 9 shows information pertaining to rectangular images in FIGS. 4B to 4D, respectively.

In the selector table T11b, two rectangular images specified by a window line number "24-x_b'-4" show rectangular images B2 and B3 in FIG. 4B. Here, the rectangular image B3 is shown by the rectangle information A, and the rectangular image B2 is shown by the rectangle information B. Also, a rectangular image specified by a window line number "24-x_b-4" shows a rectangular image B1 in FIG. 4B.

In the selector table T11c, a rectangular image specified by a window line number "24-y_c-4" shows a rectangular image B3 in FIG. 4C, and two rectangular images specified by a window line number "24-y_b-4" show rectangular images B1 and B2 in FIG. 4C. Here, the rectangular image B1 is shown by the rectangle information A, and the rectangular image B2 is shown by the rectangle information B.

In the selector table T11d, a rectangular image specified by a window line number "x_b" shows a rectangular image B1 in FIG. 4D, and two rectangular images specified by a window line number "x_b'" show rectangular images 32 and B3 in FIG. 4D. Here, the rectangular image B3 is shown by the rectangle information A, and the rectangular image B2 is shown by the rectangle information B.

Each of the selector tables T11a, T11b, T11c, and T11d is associated with a selector table use flag showing whether or not each of the selector tables can be used by the selector circuits 11a and 11b. When a value of the selector table use flag is set to 0, the corresponding selector table cannot be used, whereas the value is set to 1, it can be used. Here, a value of the selector table use flag corresponding to one of the four selector tables T11a, T11b, T11c, and T11d is set to "1", and values of the selector table use flags corresponding to the other selector tables are set to "0". In other words, when selecting rectangular image data, the selector circuits 11a and 11b refer to only one selector table at all times.

In this embodiment, the selector circuit 11a is described to select rectangular image data shown by the window line number and the rectangle information A, and the selector circuit 11b is described to select rectangular image data shown by the window line number and the rectangle information B.

(2-2-3) Specific Example of Cutting Out of Rectangular Image Data

Here, a specific example of cutting out of rectangular image data is described with use of the selector table T11a in FIG. 6.

The selector table T11a uses a value of the counter 18 corresponding to a line number of pixel data in a window input to the selector circuits 11a and 11b and outputs information about whether or not a rectangular image is included on each line in a window and positional information of the rectangular image in a column direction (X direction). The column selector circuit 22 included in the selector circuit 11a selects rectangular image data based on these pieces of information. Information stored in the selector table T11a when cutting out a rectangular image B1 in FIG. 4A is shown as rectangular image information T12a in FIG. 6. A start position of the rectangular image B1 in FIG. 4A is shown by a coordinate in a window (x, y)=(x_b, y_b), so the rectangular image B1 is shown by the rectangular image information T12a in FIG. 6. When the information is input to the selector circuit 11a, the information about whether or not a rectangular image is included corresponding to y_b$^{th}$ line shows "1" (i.e. a rectangular image is included), and a X-coordinate of the rectangular image shows x_b. Accordingly, when data on y_b$^{th}$ line is shifted to n$^{th}$ line in the shift register group, the column selector circuit 22 included in the selector circuit 11a selects pixel data Rect (x_b) in column x_b (pixel data of 16 pixels shown by a frame T1) to output to the classifier 7.

At this time, the selector circuit 11b selects rectangular image data of a rectangular image B2 in FIG. 4A, and outputs the selected rectangular image data to the classifier 7.

(2-3) Classifier 7

As shown in FIG. 1, the classifier 7 includes a characteristic amount calculation unit 13, an evaluation value calculation unit 14, and a judgment unit 15. The classifier 7 calculates an amount of characteristic and an evaluation value of each rectangular image with use of a plurality of pieces of rectangular image data output from the rectangular image cutout unit 6, and identifies whether or not a face appears in a window based on the evaluation value.

(2-3-1) Characteristic Amount Calculation Unit 13

The characteristic amount calculation unit 13 calculates an amount of characteristic for each of one or more rectangular images selected by the selector circuits 11a and 11b.

The characteristic amount calculation unit 13 outputs the calculated amount of characteristic to the ROM address calculation unit 8.

The following describes a calculation method disclosed in Patent Document 1 as an example of how to calculate an amount of characteristic.

Figure 23A:
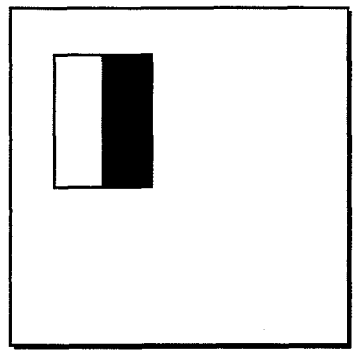
FIGS. 23A, B, C, D, and E show examples of rectangular areas to be selected.
Figure 23B:
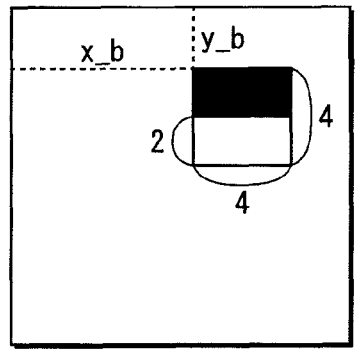
Figure 23C:
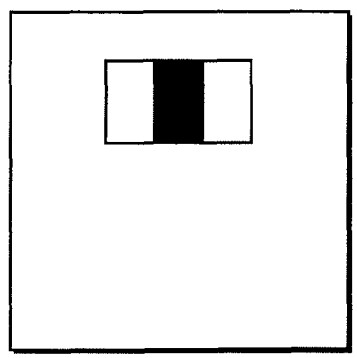
Figure 23D:
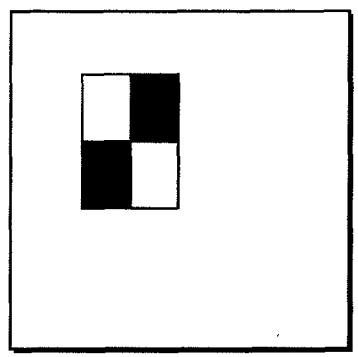
Figure 23E:
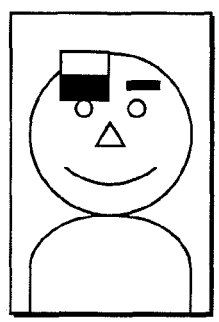
Figure 24A:
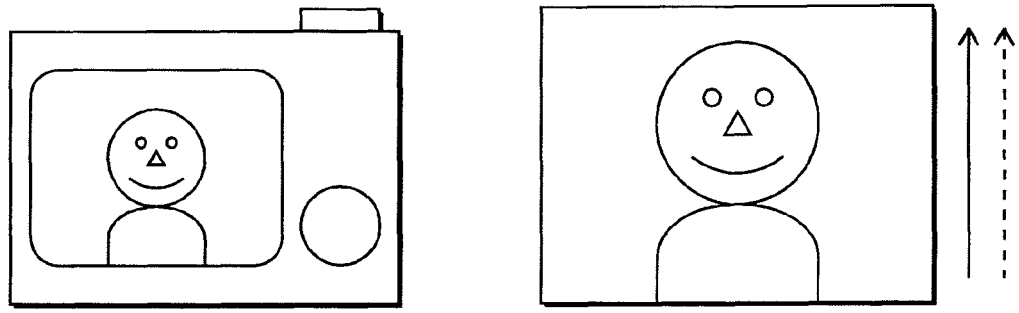
FIG. 24A shows a relationship between a zenith direction of a person and that of an input image at a normal photographing with a digital camera.
Figure 24B:
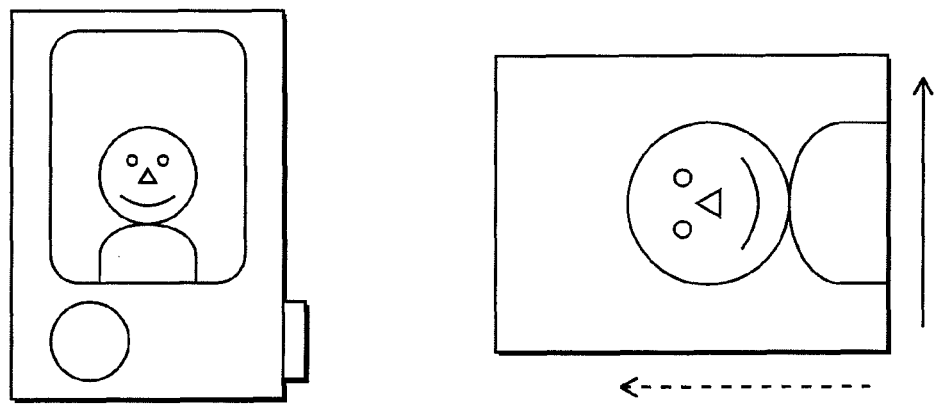
FIG. 24B shows a relationship between a zenith direction of a person and that of an input image at a vertical photographing with the digital camera.

For example, an amount of characteristic of a rectangular image shown in FIG. 23B is calculated by using a difference between a sum of pixels in a black rectangular area with 4 pixels horizontal×2 pixels vertical in an upper half of the rectangular image and a sum of pixels in a white rectangular area with 4 pixels horizontal×2 pixels vertical in a lower half of the rectangular image. First, an amount of characteristic of the upper rectangular area is calculated, and then that of the lower rectangular area is calculated. And the amount of characteristic of the rectangular image is calculated by setting characteristic of a rectangular area with larger sum of pixels (brighter) as "1", setting characteristic of a rectangular area with smaller sum of pixels (darker) as "0", and arranging the above characteristics of the black and white rectangular areas included in the rectangular image as binary information. In FIG. 23B, when the black rectangular area is darker and the white rectangular area is brighter, "01" is acquired by arranging characteristics from the characteristic of the upper area to that of the lower area. The binary value "01" acquired at this time is the amount of characteristic. Similarly, in FIG. 23C, an amount of characteristic "101" is acquired by arranging characteristics from the characteristic of the left area.

Figure 10A:
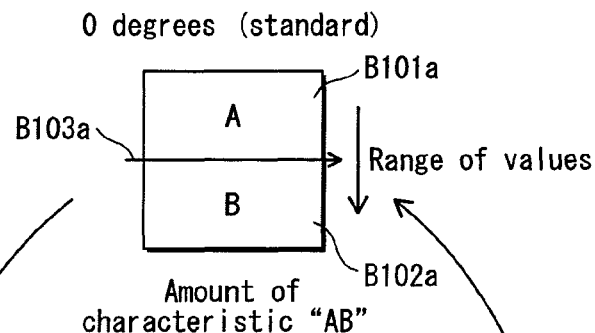
FIG. 10 shows, when separating a rectangular image into two areas, ranges of values in the separated areas calculated to acquire amounts of characteristic at respective angles.

In this embodiment, as shown in FIG. 23B, the amount of characteristic is calculated by using a difference between the sum of pixels in the upper rectangular area with 4 pixels horizontal×2 pixels vertical and the sum of pixels in the lower rectangular area with 4 pixels horizontal×2 pixels vertical based on a rectangular area to be selected at a standard angle (0 degrees). FIGS. 10A to 10D show ranges of values of the amount of characteristic at rotating angles (0 degrees, 90 degrees, reverse, and 270 degrees), respectively, in this embodiment. FIG. 10A shows a range of values of the amount of characteristic at a standard angle (0 degrees). In this case, the characteristic amount calculation unit 13 separates a rectangular image into upper and lower areas by using a horizontal axis B103a, and an amount of characteristic "AB" is acquired by arranging a sum of pixels "A" in a first area B101a and a sum of pixels "B" in a second area B102a in this order (from top to bottom).

Figure 10B:
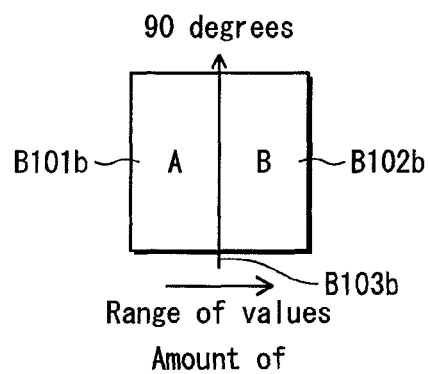

FIG. 10B shows a range of values when the rectangular image is rotated 90 degrees in a counterclockwise direction. In this case, a position relation between the first area 101a and the second area 102a, which are arranged vertically at a rotating angle 0 degrees, is changed. The first area 101a and the second area 102a are arranged horizontally. Accordingly, the characteristic amount calculation unit 13 separates a rectangular image after being rotated 90 degrees by using a vertical axis B103b, which is acquired by rotating the axis B103a 90 degrees in a counterclockwise direction, and an amount of characteristic "AB" is acquired by arranging a sum of pixels "A" in a first area B101b and a sum of pixels "B" in a second area B102b in this order (from left to right).

Figure 10D:
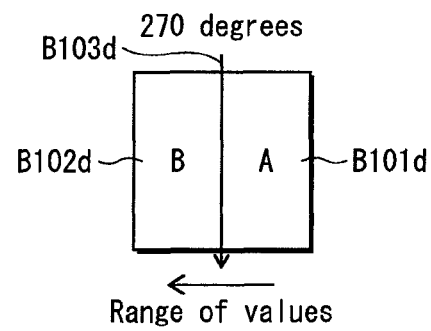
Figure 10C:
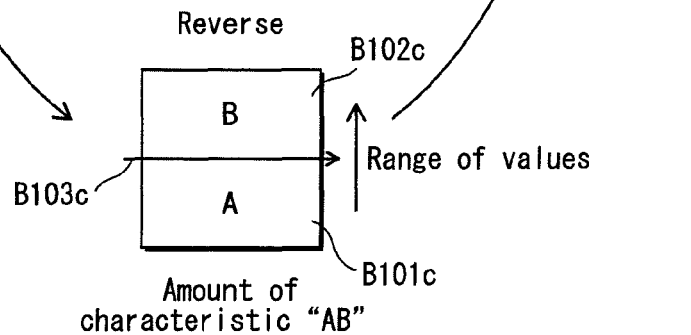

FIG. 10C shows a range of values when the rectangular image is reversed. In this case, the rectangular image is separated in the same manner as that separated at a rotating angle 0 degrees. However, it is separated by using an axis B103c. At this time, a position relation between a first area 101c and a second area 102c after the rectangular image is separated becomes opposite to the position relation at a rotating angle 0 degrees. Accordingly, the characteristic amount calculation unit 13 calculates an amount of characteristic "AB" by arranging a sum of pixels "A" in a first area B101c and a sum of pixels "B" in a second area B102c in this order (from bottom to top).

FIG. 10D shows a range of values when the rectangular image is rotated 270 degrees in a counterclockwise direction. In this case, the rectangular image is separated in the same manner as that separated at a rotating angle 90 degrees. However, it is separated by using an axis B103d. At this time, a position relation between a first area 101d and a second area 102d after the rectangular image is separated becomes opposite to the position relation at a rotating angle 90 degrees. Accordingly, the characteristic amount calculation unit 13 calculates an amount of characteristic "AB" by arranging a sum of pixels "A" in a first area B101d and "B" in a second area B102d in this order (from right to left).

As described above, it can be seen that a range of values of an amount of characteristic is specified in accordance with a direction of an axis used to separate a rectangular image.

According to the calculation method, amounts of characteristic of a rectangular image are the same regardless of rotating angle (0 degrees, 90 degrees, reverse, and 270 degrees).

Note that the calculation method to calculate an amount of characteristics of a rectangular image is an example, and not limited to this.

Also, in this embodiment, an amount of characteristic of a rectangular image is calculated by separating the rectangular image into two areas. However, a method is not limited to this. The rectangular image may be separated in a different method.

FIGS. 11A to 11D shows, as the different method, ranges of a value of an amount of characteristic of a rectangular image with 9 pixels×9 pixels when the rectangular image is separated into nine areas.

Figure 11A:
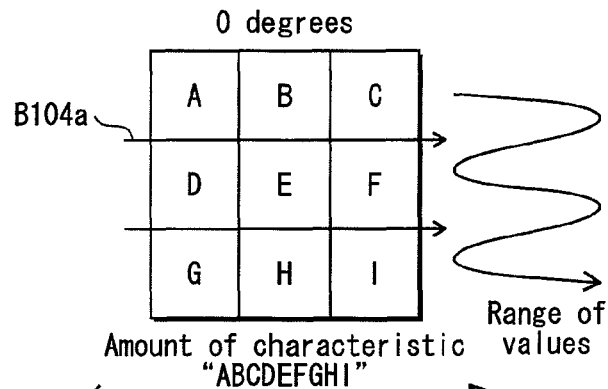
FIG. 11 shows, when separating a rectangular image into nine areas, ranges of values in the separated areas calculated to acquire amounts of characteristic at respective angles.

FIG. 11A shows a range when the rectangular image is rotated 0 degrees. In this case, an amount of characteristic is acquired by arranging values from a value of the top left area in the rectangular image in a direction from left to right and from top to bottom. That is to say, "ABCDEFGHI" is acquired as the amount of characteristic.

Figure 11B:
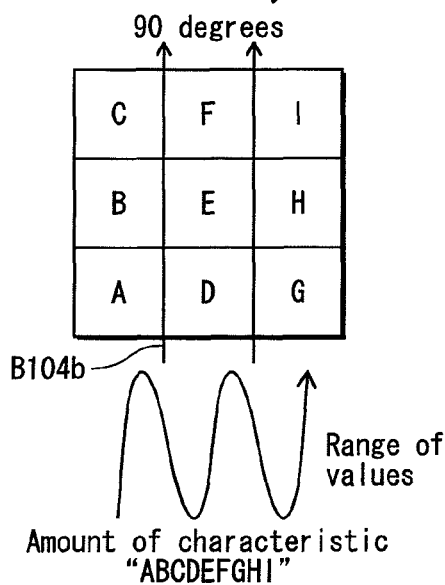

FIG. 11B shows a range when the rectangular image is rotated 90 degrees. In this case, an amount of characteristic is acquired by arranging values from a value of the bottom left area in the rectangular image in a direction from bottom to top and from left to right. That is to say, "ABCDEFGHI", which is the same as the amount of characteristic acquired at 0 degrees, is acquired as the amount of characteristic.

Figure 11D:
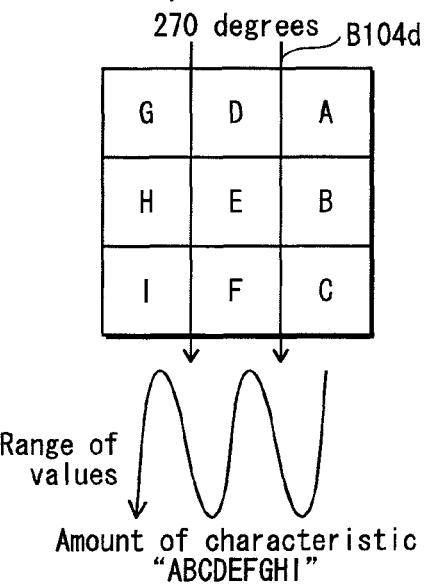
Figure 11C:
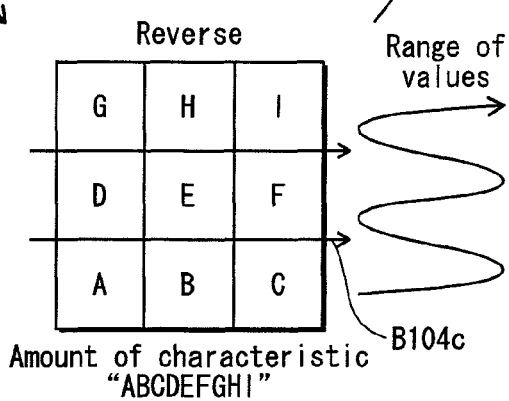

FIG. 11C shows a range when the rectangular image is reversed. In this case, an amount of characteristic is acquired by arranging values from a value of the bottom left area in the rectangular image in a direction from left to right and from bottom to top. That is to say, "ABCDEFGHI", which is the same as the amount of characteristic acquired at 0 degrees, is acquired as the amount of characteristic.

FIG. 11D shows a range when the rectangular image is rotated 270 degrees. In this case, an amount of characteristic is acquired by arranging values from a value of the top right area in the rectangular image in a direction from top to bottom and from right to left. That is to say, "ABCDEFGHI", which is the same as the amount of characteristic acquired at 0 degrees, is acquired as the amount of characteristic.

Therefore, the amounts of characteristic of the rectangular image show the same value regardless of angle.

When a rectangular image is separated into nine areas, a plurality of axises are used to separate the rectangular image. By using one of these axises, a range of an amount of characteristic is specified. For example, when a horizontal right pointing axis (e.g. an axis B104a) is used at 0 degrees, a range of an amount of characteristic of a rectangular image at the angle is specified. When the axis is rotated according to a rotating angle, a range of an amount of characteristic of a rectangular image at the rotating angle is specified by using an axis after being rotated (an axis B104b, B104c, and B104d).

(2-3-2) Evaluation Value Calculation Unit 14

The evaluation value calculation unit 14 calculates an evaluation value for a window with use of the amount of characteristic and a learning parameter (described later). Here, the learning parameter is a weighted value for the amount of characteristic. In order to use the learning parameter to calculate the evaluation value for a window, the learning parameter is associated with each amount of characteristic and acquired by preliminarily learning a large number of sample images.

The evaluation value calculation unit 14 receives, from the ROM address calculation unit 8 (described later), a learning parameter which is associated with a rectangular image selected by the selector circuit.

Upon receiving learning parameters corresponding to all rectangular images selected from one window, the evaluation value calculation unit 14 calculates accumulation values thereof, and the calculation result becomes an evaluation value.

The evaluation value calculation unit 14 outputs the calculated evaluation value to the judgment unit 15.

(2-3-3) Judgment Unit 15

The judgment unit 15 judges whether or not a face appears in a window based on the evaluation value of one window.

Specifically, the judgment unit 15 judges whether or not a face appears by comparing the evaluation value and a threshold value which is preliminarily stored in the judgment unit 15.

When the evaluation value is the threshold value or larger, the judgment unit 15 judges a target of the judgment as a face (i.e. a face appears in a window), when the evaluation value is smaller than the threshold value, the judgment unit 15 judges it as a non-face (i.e. a face does not appears in a window). The judgment result is output to the outside from the classifier 7.

Note that the calculation method of the evaluation value and the judgment method of a face/non-face are just examples, and not limited to these.

(2-4) ROM 9

The ROM 9 is a learning parameter storing unit for storing the learning parameter used by the evaluation value calculation unit 14 to calculate the evaluation value.

Figure 12:
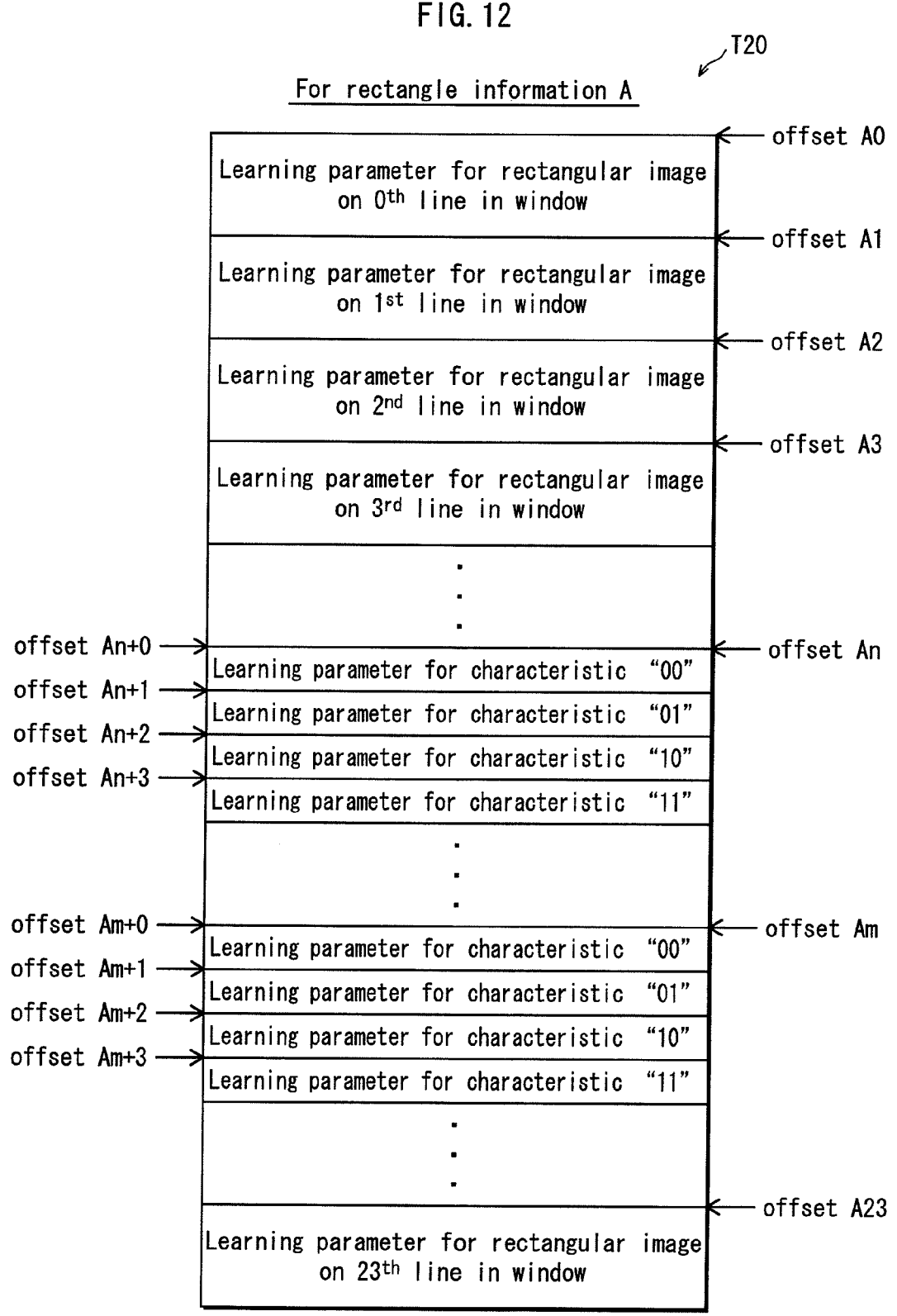
FIG. 12 shows a memory map for rectangle information A stored in a ROM 9.
Figure 13:
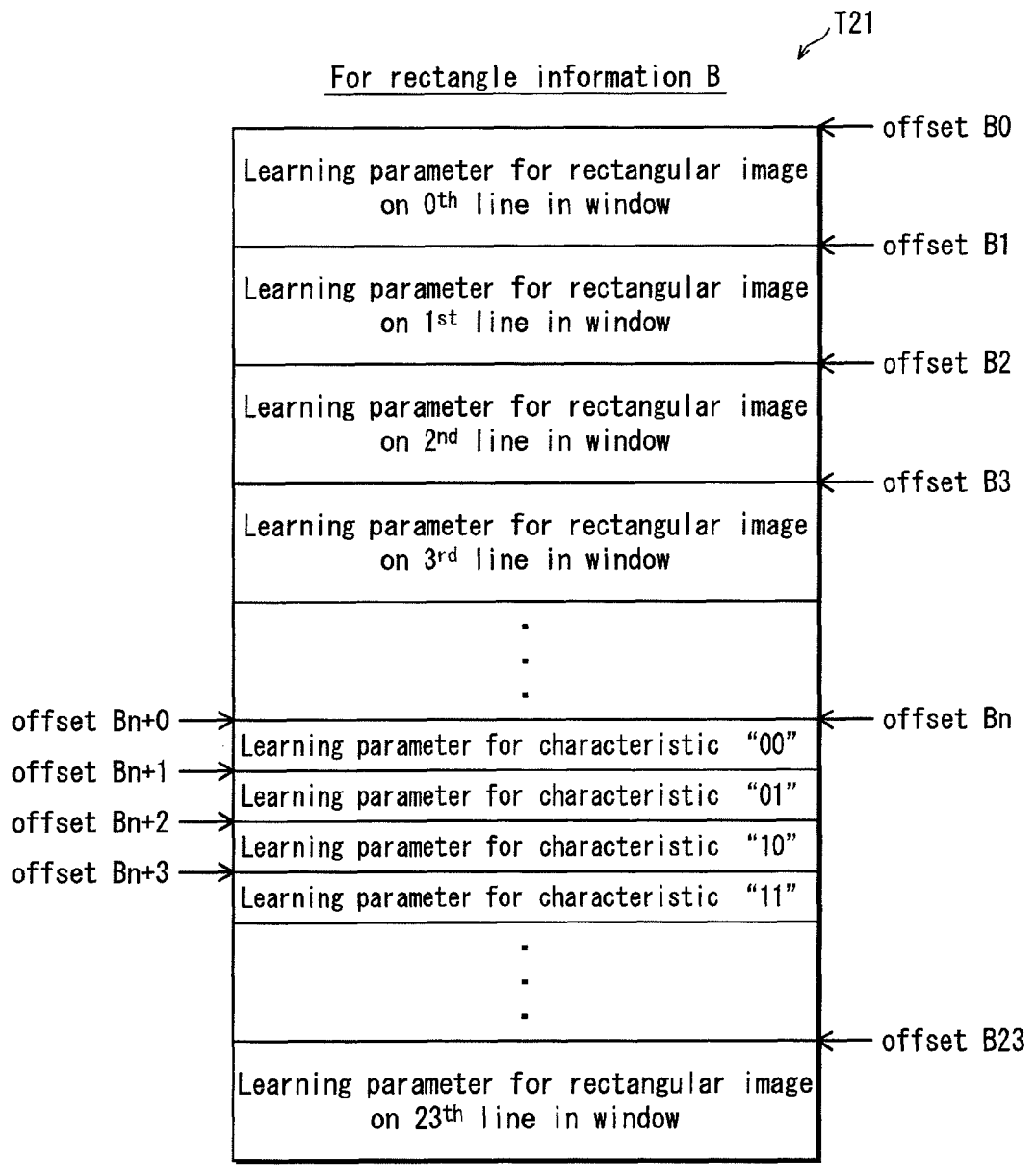
FIG. 13 shows a memory map for rectangle information B stored in the ROM 9.

Examples of memory maps T20 and T21 of the learning parameter stored in the ROM 9 are shown in FIGS. 12 and 13.

In the memory map T20, for each of one or more rectangular images shown in a column of the rectangle information A in a selector table, learning parameters for amounts of characteristic which the rectangular image can have are stored.

In the memory map T21, for each of one or more rectangular images shown in a column of the rectangle information B in a selector table, learning parameters for amounts of characteristic that the rectangular image can have are stored.

For example, four learning parameters from an offset address "offset An" in FIG. 12 are learning parameters for amounts of characteristic that the rectangular image B1 shown in FIG. 4 can have. Also, four learning parameters from an offset address "offset Am" in FIG. 12 are learning parameters for amounts of characteristic that the rectangular image B3 shown in FIG. 4 can have. Further also, four learning parameters from an offset address "offset En" in FIG. 13 are learning parameters for amounts of characteristic that the rectangular image B2 shown in FIG. 4 can have.

Note that a method for specifying a learning parameter corresponding to a rectangular image is described later.

(2-5) ROM Address Calculation Unit 8

As shown in FIG. 1, the ROM address calculation unit 8 includes an address conversion table storage unit 16 and an address generation unit 17. The ROM address calculation unit 8 is a learning parameter reference calculation unit for calculating a reference address in the ROM 9 with use of the amount of characteristic output from the classifier 7.

(2-5-1) Address Conversion Table Storage Unit 16

The address conversion table storage unit 16 stores an address conversion table composed of conversion information to convert the reference address in the ROM 9.

The address conversion table storage unit 16 stores address conversion tables T31a, T31b, T31c and T31d for the template frames shown in FIGS. 4A to 4D, respectively. Each of the address conversion tables shows an offset address of a storage position of a learning parameter which is stored in the ROM 9 and to be referred by a rectangular image selected based on one of the template frames. Examples of the address conversion tables T31a, T31b, T31c, and T31d are shown in FIGS. 14A and 14B, and FIGS. 15A and 15B. The address conversion table T31a shows an offset address of a learning parameter which is stored in the ROM 9 and to be referred by each rectangular image shown in FIG. 4A. The address conversion table T31b shows an offset address of a learning parameter which is stored in the ROM 9 and to be referred by each rectangular image shown in FIG. 4B. The address conversion table T31c shows an offset address of a learning parameter which is stored in the ROM 9 and to be referred by each rectangular image shown in FIG. 4C. And, the address conversion table T31d shows an offset address of a learning parameter which is stored in the ROM 9 and to be referred by each rectangular image shown in FIG. 4D. This means that the address conversion tables T31a, T31b, T31c, and T31d correspond to the selector tables T11a, T11c, and T11d, respectively.

Each of the address conversion tables T31a to T31d has a storage area including one or more combinations of a window line number, output (offset) for the rectangle information A, and output (offset) for the rectangle information B.

The window line number is a value showing a line number in a window.

The output (offset) for the rectangle information A shows an offset, when a value shown by the window line number is a Y-coordinate of a start position, to be referred by a rectangular image specified by the rectangle information A in a corresponding selector table.

The output (offset) for the rectangle information B shows an offset, when a value shown by the window line number is a Y-coordinate of a start position, to be referred by a rectangular image specified by the rectangle information B in a corresponding selector table.

Each of the address conversion tables T31a, T31b, T31c, and T31d is associated with an address conversion table use flag showing whether or not each address conversion table can be used by the address generation unit 17 (described later). When a value of the address conversion table use flag is set to 0, the corresponding address conversion table cannot be used, whereas a value of the address conversion table use flag is set to 1, it can be used. Here, a value of the address conversion table use flag corresponding to one of the four address conversion tables T31a, T31b, T31c, and T31d is set to "1", and values of the address conversion table use flags corresponding to the other address conversion tables are set to "0". In other words, the address generation unit 17 refers to only one address conversion table at all times.

(2-5-2) Address Generation Unit 17

The address generation unit 17 generates (calculates) a reference address (ROM address) of a learning parameter with use of an amount of characteristic output from the classifier 7 in accordance with a usable address conversion table.

Upon receiving the amount of characteristic from the characteristic amount calculation unit 13, the address generation unit 17 calculates a ROM address showing an address in the ROM 9 to be accessed with use of the usable address conversion table and the following equation 1.

ROM address=Table (window line number)+an amount of characteristic  (Equation 1)

Table (window line number) in the equation 1 is an offset address acquired from the usable address conversion table. Also, the amount of characteristic is an amount of characteristic input from the classifier 7, and it is acquired by arranging the brightness and darkness information.

As an example, the window line number is used to acquire the offset address from the Table, but it is not limited. For example, the order of a rectangular image which has been preliminarily determined through learning may be used.

The address generation unit 17 accesses the ROM 9 based on the calculated ROM address, and acquires a learning parameter corresponding to an amount of characteristic which is calculated for a rectangular image in process. The acquired learning parameter is output to the evaluation value calculation unit 14 included in the classifier 7.

The following describes a case where the rectangular image B1 shown in FIG. 4 has the same characteristics as those of a rectangular image shown in FIG. 23B, that is, a case where an amount of characteristic is "01". In this case, the rectangular image B1 is specified by the rectangle information A in the selector table T11a shown in FIG. 6. Therefore, the address generation unit 17 acquires an offset address "offset An" first by using a window line number y_b in the address conversion table T31a. Then, since the amount of characteristic of the rectangular image B1 is "01", the address generation unit 17 calculates a ROM address "offset An+1" with use of the equation 1 and the acquired offset address "offset An". Here, it can be found that the learning parameter corresponding to the rectangular image B1 is stored in an address shown by the calculated ROM address "offset An+1". Based on the calculated ROM address "offset An+1", the address generation unit 17 acquires the learning parameter corresponding to the rectangular image B1, and outputs the acquired learning parameter to the evaluation value calculation unit 14 in the classifier 7.

(3) Angle Set Unit 10

The angle set unit 10 switches between physical objects to be identified by the classifier 7. Specifically, the angle set unit 10 switches between physical objects to be identified by switching between the selector tables used by the selector circuits 11a and 11b, and between the address conversion tables used by the address generation unit 17.

The angle set unit 10 outputs an angle set signal to the rectangular image cutout unit 6 and the ROM address calculation unit 8 both included in the face detection unit 5. The angle set signal shows one of the standard angle (0 degrees) and the rotating angles (90 degrees, reverse, and 270 degrees) of a face to be detected, that is, it shows a usable selector table and a usable address conversion table.

Figure 16A:
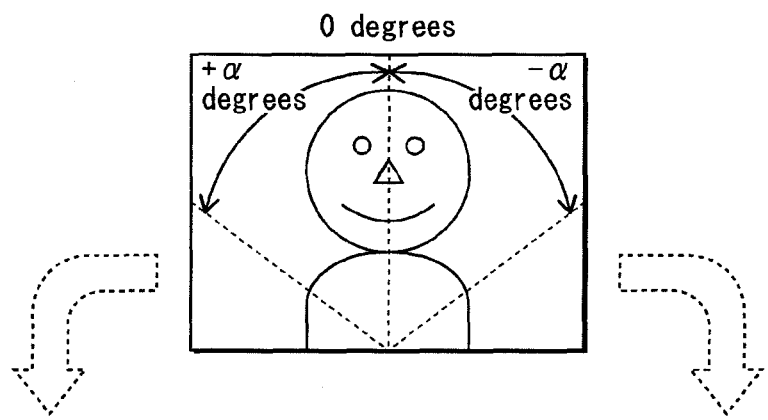
FIGS. 16A, B, C, and D show relationships between angles (0 degrees, 90 degrees, reverse, and 270 degrees) set by an angle set unit 10 and angular ranges to detect a face.
Figure 16B:
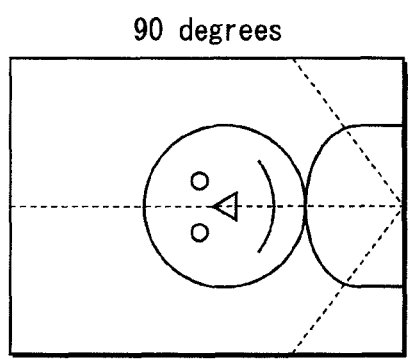
Figure 16D:
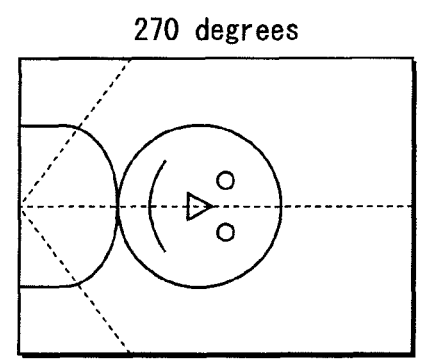
Figure 16C:
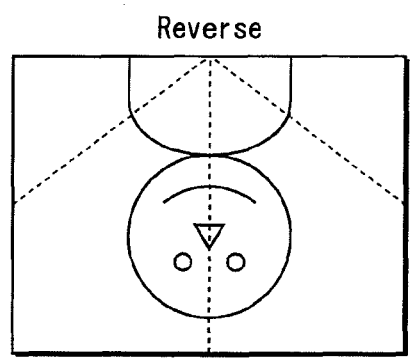

Angles set by the angle set unit 10 and angular ranges of a face to be detected are shown in FIGS. 16A to 16D. Here, the angle indicates an angle measured by rotating a line which runs perpendicular to an input image in a counterclockwise direction. FIG. 16A shows an angular range at 0 degrees (standard angle). The face detection unit 5 performs face detection in the range of ±α degrees (e.g. ±45 degrees) from an erected-state. Similarly, FIG. 16B shows an angular range at 90 degrees (rotating angle 90 degrees), FIG. 16C shows an angular range at 180 degrees (rotating angle reverse), and FIG. 16D shows an angular range at 270 degrees (rotating angle 270 degrees), respectively. Angular ranges in which the face detection is performed are the same as that shown in FIG. 16A.

Note that the standard angle (0 degrees) and the rotating angles (90 degrees, reverse, and 270 degrees) are just examples, and an angle and a type of the angle are not limited to these. Also, when α showing the angular range in which the face detection is performed is 45 degrees, face detection from all rotating direction (360 degrees) can be performed. However, it is not limited to 45 degrees.

The angle set signal is input to the rectangular image cutout unit 6 and the ROM address calculation unit 8. In accordance with an angle shown by the angle set signal, one of the selector tables can be used. Also, an address conversion table corresponding to the usable selector table can be used. Specifically, in accordance with an angle shown by the angle set signal, (i) a selector table use flag corresponding to a selector table to be used and (ii) an address conversion table use flag corresponding to an address conversion table corresponding to the selector table are set to a value "1", and (iii) selector table use flags corresponding to the other selector tables and (iv) address conversion table use flags corresponding to the other address conversion tables are set to a value "0". For example, when an angle shown by the angle set signal is a standard angle (0 degrees), a selector table use flag corresponding to the selector table T11a is set to a value "1", and selector table use flags corresponding to the other selector tables are set to a value "0". Also, an address conversion table use flag corresponding to the address conversion table T31a corresponding to the selector table T11a is set to a value "1", and address conversion table use flags corresponding to the other address conversion tables are set to "0". In this way, the selector circuits 11a, 11b, and the address generation unit 17 can specify the selector table T11a which should be used at a standard angle (0 degrees), and the address conversion table T31a corresponding to the selector table T1a.

A usable selector table and a usable address conversion table are required to be switched, because a cutout position of a rectangular image is changed depending on an angle to be set. As shown in a specific example, switching of a usable table can be realized by changing a value of a flag corresponding to each table.

The angle set unit 10 receives, from a processing control unit 19, change information instructing to change an angle. Here, the change information includes information showing an angle after being changed.

The angle set unit 10 outputs the angle set signal showing the angle included in the received change information to the rectangular image cutout unit 6 and the ROM address calculation unit 8. Then, in accordance with the angle, the angle set unit 10 allows one of the selector tables and one of the address conversion tables to be used.

For example, when information showing 0 degrees (standard angle 0 degrees) is included in the change information, the angle set unit 10 sets a value "1" to a selector table use flag and an address conversion table use flag corresponding to the selector table T11a and the address conversion table T31a, respectively, in accordance with the angle set signal showing the standard angle 0 degrees. And, a value "0" is set to selector table use flags and address conversion table use flags corresponding to the other selector tables and the other address conversion tables, respectively.

(4) Others

The following describes a timing when the angle set unit 10 receives the change information output from the processing control unit 19

When the image processing device 1 performs face detection processing, the processing control unit 19 outputs the change information to the angle set unit 10 such that the selector tables and the address conversion tables are switched until a face is detected, or until face detection processing for all angles (0 degrees, 90 degrees, reverse, and 270 degrees) is performed. For example, at the start of the face detection processing, the processing control unit 19 outputs the change information showing the standard angle 0 degrees to the angle set unit 10. When the classifier 7 judges that a face does not appear, the processing control unit 19 outputs the change information showing the rotating angle 90 degrees to the angle set unit 10. When the classifier 7 judges that a face appears, the processing control unit 19 inhibits output of an angle set signal to the angle set unit 10. That is to say, the processing control unit 19 outputs the change information showing the angle 0 degrees, 90 degrees, reverse, and 270 degrees, in that order, to the angle set unit 10 such that the selector tables and the address conversion tables are switched until the classifier 7 judges that a face appears. When a face is not detected for all angles, the processing control unit 19 inhibits face detection processing for a window targeted for the detection.

In the above example, although an angle is switched from 0 degrees (at the start of detection) to 90 degrees, reverse, and 270 degrees, in this order, until a face is detected in a window, the order of detection is not limited to this. An angle at the start of detection may be any of 0 degrees, 90 degrees, reverse, and 270 degrees. Also, as for the order of switching between angles, an angle may be switched by randomly selecting an angle corresponding to a table which is not permitted to be used.

1.2 Operation of the Image Processing Device 1

The following describes operation of the image processing device 1, and in particular, switching processing pertaining to switching between physical objects to be identified, and face detection processing.

(1) Switching Processing

Figure 17:
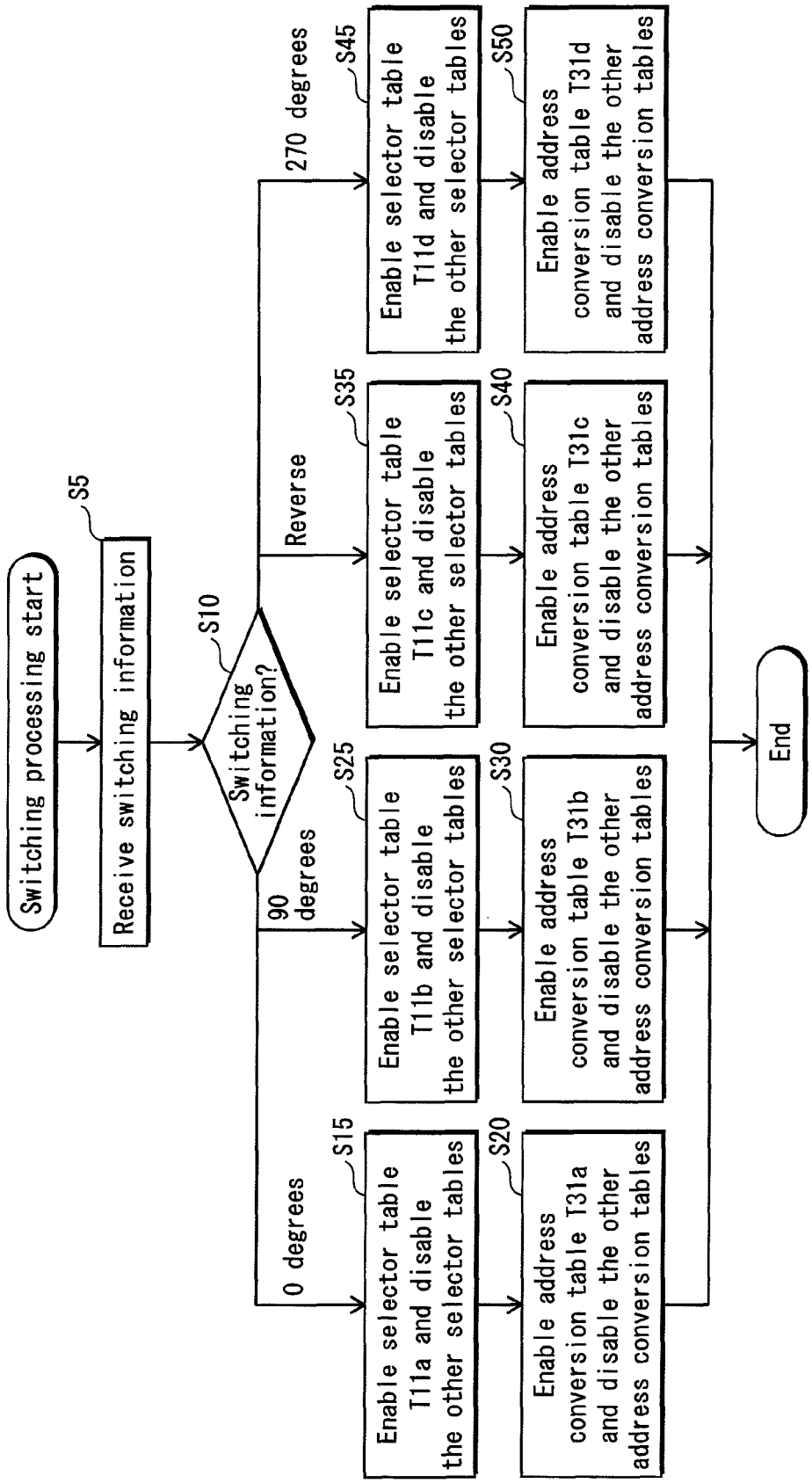
FIG. 17 is a flow chart showing operation of switching processing.

The following describes operation of switching processing with use of a flow chart shown in FIG. 17.

The angle set unit 10 receives switching information from the outside. (step S5)

When an angle included in the switching information is 0 degrees ("0 degrees" in step S10), the angle set unit 10 enables only the selector table T11a in accordance with the angle set signal showing an angle 0 degrees, and disables the other selector tables (step S15). Specifically, the angle set unit 10 sets a value "1" to a selector table use flag corresponding to the selector table T11a in accordance with the angle set signal showing an angle 0 degrees, and sets a value "0" to selector table use flags corresponding to the other selector tables. Also, the angle set unit 10 enables only the address conversion table T31a in accordance with the angle set signal showing an angle 0 degrees, and disables the other address conversion tables (step S20). Specifically, the angle set unit 10 sets a value "1" to an address conversion table use flag corresponding to the address conversion table T31a in accordance with the angle set signal showing an angle 0 degrees, and sets a value "0" to address conversion table use flags corresponding to the other address conversion tables.

When an angle included in the switching information is 90 degrees ("90 degrees" in step S10), the angle set unit 10 enables only the selector table T11b in accordance with the angle set signal showing an angle 90 degrees, and disables the other selector tables (step S25). Specifically, the angle set unit 10 sets a value "1" to a selector table use flag corresponding to the selector table T11b in accordance with the angle set signal showing an angle 90 degrees, and sets a value "0" to selector table use flags corresponding to the other selector tables. Also, the angle set unit 10 enables only the address conversion table T31b in accordance with the angle set signal showing an angle 90 degrees, and disables the other address conversion tables (step S30). Specifically, the angle set unit 10 sets a value "1" to an address conversion table use flag corresponding to the address conversion table T31b in accordance with the angle set signal showing an angle 90 degrees, and sets a value "0" to address conversion table use flags corresponding to the other address conversion tables.

When an angle included in the switching information is a reverse angle (180 degrees) ("reverse" in step S10), the angle set unit 10 enables only the selector table T11c in accordance with the angle set signal showing a reverse angle, and disables the other selector tables (step S35). Specifically, the angle set unit 10 sets a value "1" to a selector table use flag corresponding to the selector table T11c in accordance with the angle set signal showing a reverse angle, and sets a value "0" to selector table use flags corresponding to the other selector tables. Also, the angle set unit 10 enables only the address conversion table T31c in accordance with the angle set signal showing a reverse angle, and disables the other address conversion tables (step S40). Specifically, the angle set unit 10 sets a value "1" to an address conversion table use flag corresponding to the address conversion table T31c in accordance with the angle set signal showing a reverse angle, and sets a value "0" to address conversion table use flags corresponding to the other address conversion tables.

When an angle included in the switching information is 270 degrees ("270 degrees" in step S10), the angle set unit 10 enables only the selector table T11d in accordance with the angle set signal showing an angle 270 degrees, and disables the other selector tables (step S45). Specifically, the angle set unit 10 sets a value "1" to a selector table use flag corresponding to the selector table T11d in accordance with the angle set signal showing an angle 270 degrees, and sets a value "0" to selector table use flags corresponding to the other selector tables. Also, the angle set unit 10 enables only the address conversion table T31d in accordance with the angle set signal showing an angle 270 degrees, and disables the other address conversion tables (step S50). Specifically, the angle set unit 10 sets a value "1" to an address conversion table use flag corresponding to the address conversion table T31d in accordance with the angle set signal showing an angle 270 degrees, and sets a value "0" to address conversion table use flags corresponding to the other address conversion tables.

(2) Operation of Face Detection Processing

Figure 18:
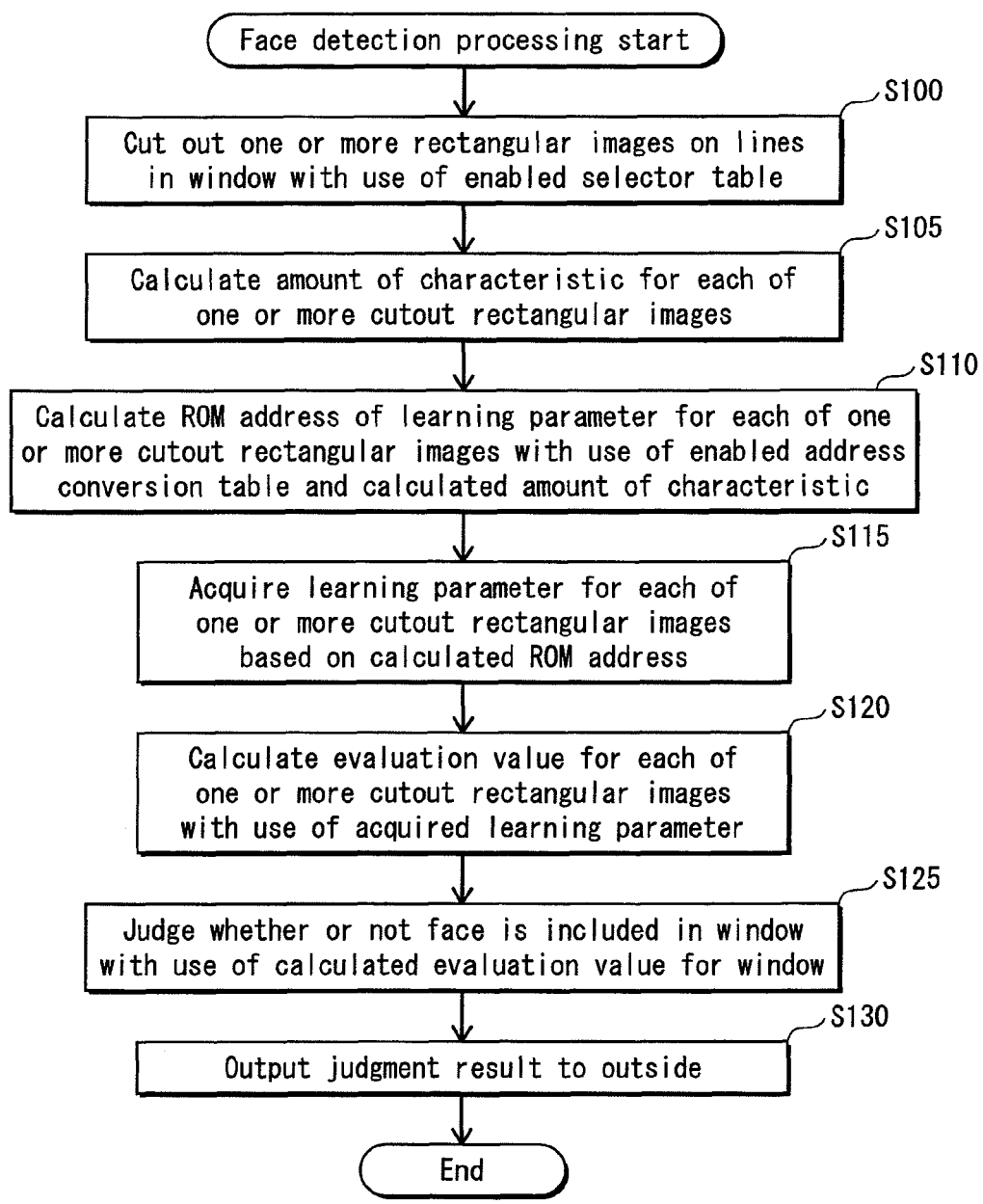
FIG. 18 is a flow chart showing operation of face detection processing.

The following describes operation of face detection processing with use of a flow chart shown in FIG. 18.

The selector circuits 11a and 11b cuts out one or more rectangular images on lines in a window by using a usable selector table, i.e., a selector table with which a selector table use flag set to a value "1" is associated (step S100).

The characteristic amount calculation unit 13 calculates an amount of characteristic for each of the one or more rectangular images cut out by the selector circuits 11a and 11b (step S105).

The address generation unit 17 calculates, for each of the one or more rectangular images cut out by the selector circuits 11a and 11b, a ROM address (a reference address) of a learning parameter to be referred with use of the amount of characteristic of the rectangular image calculated by the characteristic amount calculation unit 13 and a usable address conversion table (i.e. an address conversion table with which a address conversion table use flag set to a value "1" is associated) (step S110), and acquires the learning parameter corresponding to the rectangular image based on the calculated ROM address (step S115).

The evaluation value calculation unit 14 calculates an evaluation value for the window with use of the leaning parameter acquired for each of the one or more rectangular images cut out by the selector circuits 11a and 11b (step S120).

The judgment unit 15 judges whether or not a face appears in the window with use of the calculated evaluation value (step S125), and outputs a result of the judgment to the outside (step S130).

1.3 Modifications

Although the present invention has been explained in accordance with the above embodiment 1, it is obvious that the present invention is not limited to the above embodiment. The following modifications are also included in the present invention.

(1) The number of tiers the shift register has, a size and a shape of a rectangular image, and the like shown in the above embodiment 1 are examples, and not limited to these.

The number of tiers the shift register has needs to be only the same as a maximum vertical size of a rectangular image to be selected (to be cut out) or more.

Also, vertical pixels of a rectangular image may not be the same as horizontal pixels of the rectangular image.

A rectangular image may have a plurality of shapes or size. In this case, shape information of the rectangular image (e.g. information showing a size of the rectangular image) is added to each column of the rectangle information A and the rectangle information B in the selector tables shown in FIGS. 6 to 9. A shape selector for selecting a shape of the rectangular image is also added to the selector circuits 11a and 11b in addition to the column selector circuit 22, and the shape selector selects a rectangular image having a shape shown by the shape information.

Also, a shape of an image to be selected is not limited to a rectangle. For example, an image to be selected may have a shape of a circle and an ellipse. When a size of a circle to be selected is fixed, a coordinate showing a center of the circle to be selected is given as the start position. In contrast, when a size of a circle to be selected is variable, a radius of the circle to be selected is additionally given as the shape information.

(2) In the above embodiment 1, the selector circuit is described to select (cut out) one rectangular image on one line, but it is not limited to this.

One selector circuit may select (cut out) a plurality of rectangular images on one line.

(3) In the above embodiment 1, the selector circuits 11a and 11b are described to select (cut out) a rectangular image with reference to the same selector table, but not limited to this.

Each selector circuit may be associated with different selector tables.

For example, selector tables composed of the window line number and the rectangle information A shown in FIGS. 6 to 9 are associated with the selector circuit 11a, and selector tables composed of the window line number and the rectangular image B are associated with the selector circuit 11b.

Figure 19:
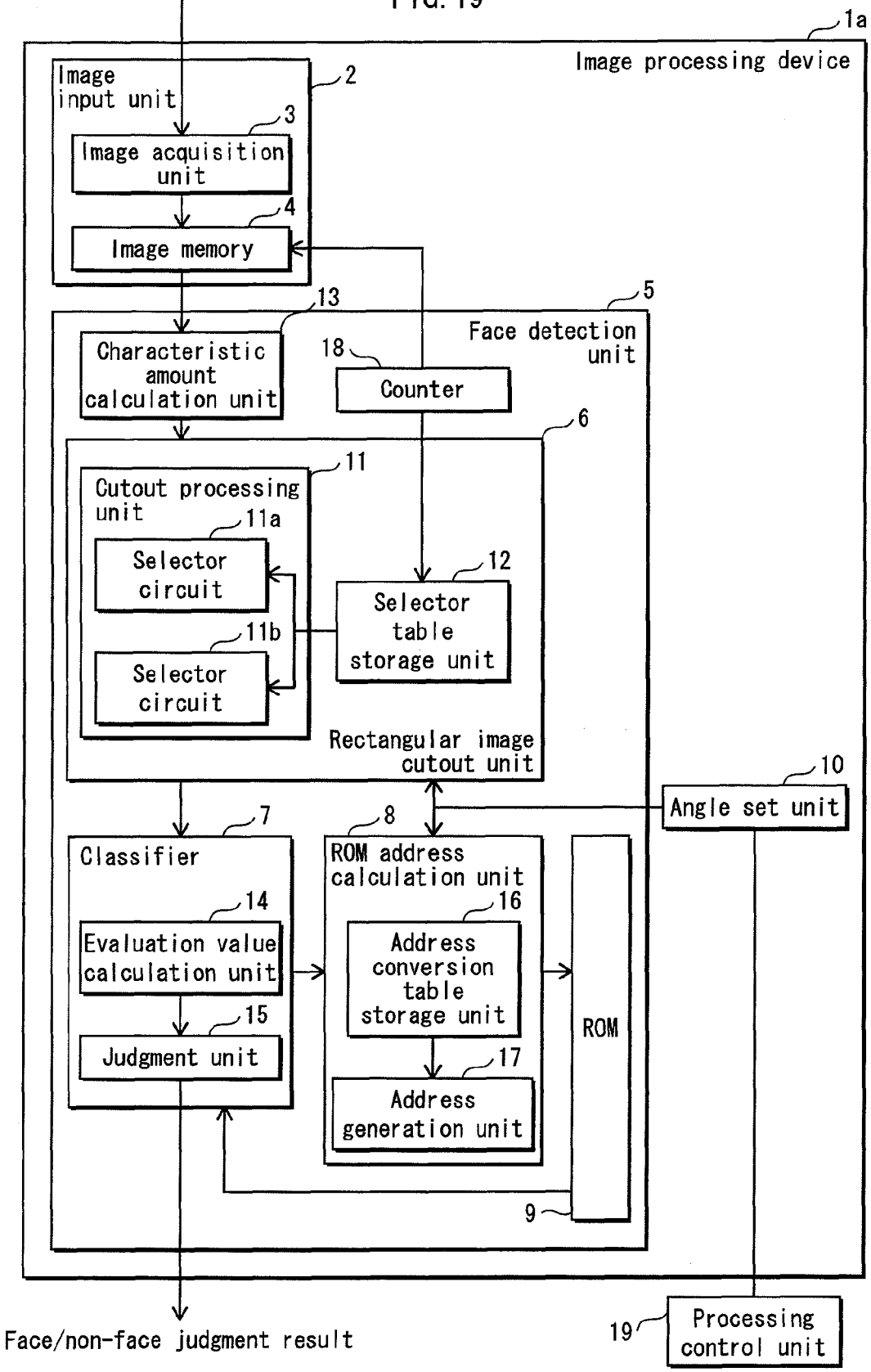

(4) In the above embodiment 1, the image processing device 1 is described to calculate the amount of characteristic after selecting a rectangular image, but it is not limited to this. As shown in FIG. 19, the image processing device 1a may preliminarily calculate the amount of characteristic of a rectangular image corresponding to all pixels locations, and may select a result of the calculation. When many rectangular images are included, since the calculation result of the amount of characteristic can be shared by preliminarily calculating the amount of characteristic, a calculation amount can be reduced as a whole.

(5) In the above embodiment 1, the image processing device 1 is described to perform face detection processing as an example of detecting a physical object, but it is not limited to this.

A detection target is only required to have a characteristic part which can be identified as a physical object targeted for the detection (e.g. a face of an animal, an upper or whole body of a person).

(6) In the above embodiment 1, a flag is used to identify whether each selector table and each address conversion table are enabled or disabled, but it is not limited to this.

Any method to realize the identification may be adopted as long as whether each table is enabled or disabled is identified by the method. For example, the selector table storage unit 12 has a referable area and a non-referable area, and four selector tables are stored in the non-referable area. The angle set unit 10 copies only a usable selector table to the referable area so that the selector table stored in the referable area can be used. The above method may also be realized by the address conversion table storage unit having the referable area and the non-referable area. That is to say, usable selector table and address conversion table are stored in the referable areas in the selector table storage unit and the address conversion table storage unit, respectively. And the other selector tables and the other address conversion tables are stored in the non-referable areas in the selector table storage unit and the address conversion table storage unit, respectively. Here, the referable area is an area which is allowed to be accessed from the outside (here, the selector circuits 11a and 11b, and the address generation unit 17), and the non-referable area is an area which is not allowed to be accessed from the outside.

An access right showing whether or not each selector table and each address conversion table can be accessed may be associated with each of the tables. In this case, the angle set unit 10 set the access right such that only usable selector table and address conversion table are allowed to be accessed, and the other unusable selector tables and address conversion tables are not allowed to be accessed.

(7) In the above embodiment 1, an angle is described to be a standard angle 0 degrees, rotating angles 90 degrees and 270 degrees which are rotated in a counterclockwise direction from the standard angle, and a reverse angle, but the angle is not limited to these.

The angle may be 0 degrees, 90 degrees, and 270 degrees, which are rotated in a clockwise direction from the standard angle, and a reverse.

In stead of the reverse angle, the angle may be a rotating angle 180 degrees. In this case, a start position of the rectangular image after being rotated 180 degrees has to be changed. For example, a start position of the rectangular image B4 shown in FIG. 5A (x, y) is changed to (24-x-w, 24-y-h). It can be realized by changing the selector table T11c and the address conversion table T31c based on a relationship between a start position at 0 degrees (x, y) and a start position after being rotated 180 degrees (24-x-w, 24-y-h). For example, a coordinate of a start position of the rectangular image B1 at the rotating angle 180 degrees becomes (24-x_b-4, 24-y_b-4).

(8) In the above embodiment 1, the processing control unit 19 is described to be located outside of the image processing device 1, but it is not limited to this.

The processing control unit 19 may be located inside of the image processing device 1.

(9) In the above embodiment 1, the selector table storage unit and the address conversion table storage unit are described to be separately constructed, and store the selector tables 11a to 11d and address conversion tables 31a to 31d, respectively, but it is not limited to this.

One storage unit may store the selector tables 11a to 11d and the address conversion tables 31a to 31d.

Also, a selector table and a corresponding address conversion table may be managed by one management table. In this case, the management table has, for example, an area for storing one or more combinations of the window line number, the rectangle information A, and the rectangle information B. The window line number is a value showing a line number in a window. The rectangle information A and the rectangle information B are composed of information about whether or not a rectangular image is included, an X-coordinate of the rectangular image, and an output (an offset address). Since the information about whether or not a rectangular image is included, the X-coordinate of the rectangular image, and the output (the offset address) are described above, explanations thereof are omitted here.

(10) In the above embodiment 1, an angle is changed for a window until a face is detected, but it is not limited to this.

Face detection for image data (input image) to be shot may be performed by using one angle. When a face is not detected, face detection for the input image may be performed by using another angle.

(11) The above embodiment and the above modifications may be combined with each other.

2. Embodiment 2

Figure 20:
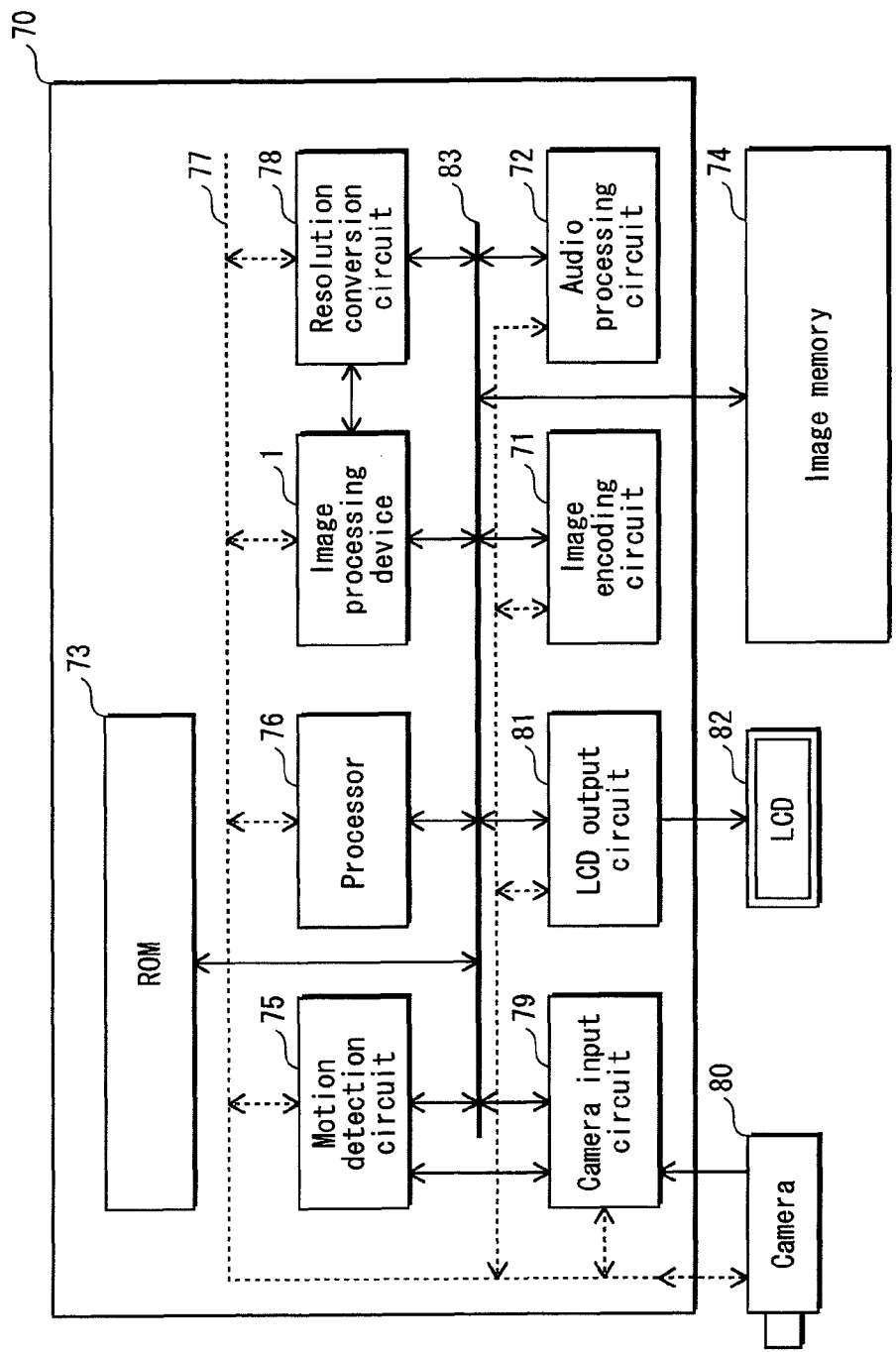
FIG. 20 is a block diagram showing a structure of a semiconductor integrated circuit 70.

The following describes embodiment 2 of the present invention with use of FIG. 20.

Generally, a semiconductor integrated circuit 70 is composed of a MOS transistor like a CMOS, and a specific logic circuit is realized by a connection structure of the MOS transistor. In resent years, since an integration degree of a semiconductor integrated circuit has been advanced, a highly complex logic circuit (e.g. the image processing device in the present invention) can be realized by one or several semiconductor integrated circuits.

The semiconductor integrated circuit 70 includes the image processing device 1 described in embodiment 1, an image encoding circuit 71, an audio processing unit 72, a ROM 73, a motion detection circuit 75, a processor 76, a control bus 77, a resolution conversion circuit 78, a camera input circuit 79, an LCD (Liquid Crystal Display) output circuit 81, and an internal bus 83. These elements are connected with each other via the internal bus 83, and input/output data.

Here, the image processing device 1 acquires an input image from the image memory 74 via the internal bus 83.

The camera input circuit 79 receives a moving image from a camera 80, and performs processing to convert the received moving image to digital data.

The motion detection circuit 75 performs processing pertaining to motion compensation for the moving image converted to digital data.

After the processing pertaining to the motion compensation is performed for the moving image converted to digital data, the image encoding circuit 71 performs processing pertaining to encoding of an image to store the image in the image memory 74. Also, the image encoding circuit 71 reads out the encoded image data from the image memory 74, and decodes the read out encoded image data. The image processing device 1 acquires the decoded image data.

The audio processing unit 72 performs processing to convert an audio input from the camera 80 to audio data.

The ROM 73 has an area for storing data to be processed. For example, the ROM 73 stores the audio data processed by the audio processing unit 72.

The resolution conversion circuit 78 performs processing to convert resolution of image data to be processed by the image processing device 1.

The LCD output circuit 81 outputs image data to be displayed to the LCD (Liquid Crystal Display) 82. Also, as for an area in which a face is detected, it causes the LCD 82 to display a frame surrounding the area.

The processor 76 controls processing pertaining to an entire operation of the semiconductor integrated circuit 70.

The processor 76 operates similarly to the processing control unit 19 shown in the above embodiment 1, and controls switching between the selector tables and between the address conversion tables until the image processing device 1 detects a face, or until face detection processing for all angles is performed.

Also, the processor 76 controls, via the control bus 77, operation of elements connected to the control bus 77.

In this embodiment, the angle set unit 10 is described to be included in the image processing device 1 similarly to embodiment 1, but it is not limited to this. The angle set unit 10 may be included in the processor 76. In other words, operation of the angle set unit 10 may be performed by the processor 76.

As described in embodiment 1, the image processing device 1 included in the semiconductor integrated circuit 70 realizes face detection processing in an image in which a face is rotated only by replacing information stored in tables. Accordingly, the image processing device 1 can perform face detection processing in an image input from the camera 80.

Also, since the image processing device 1 can be realized by the semiconductor integrated circuit 70, a digital video camera and a surveillance camera can be downsized and power consumption can be reduced.

3. Embodiment 3

Figure 21:
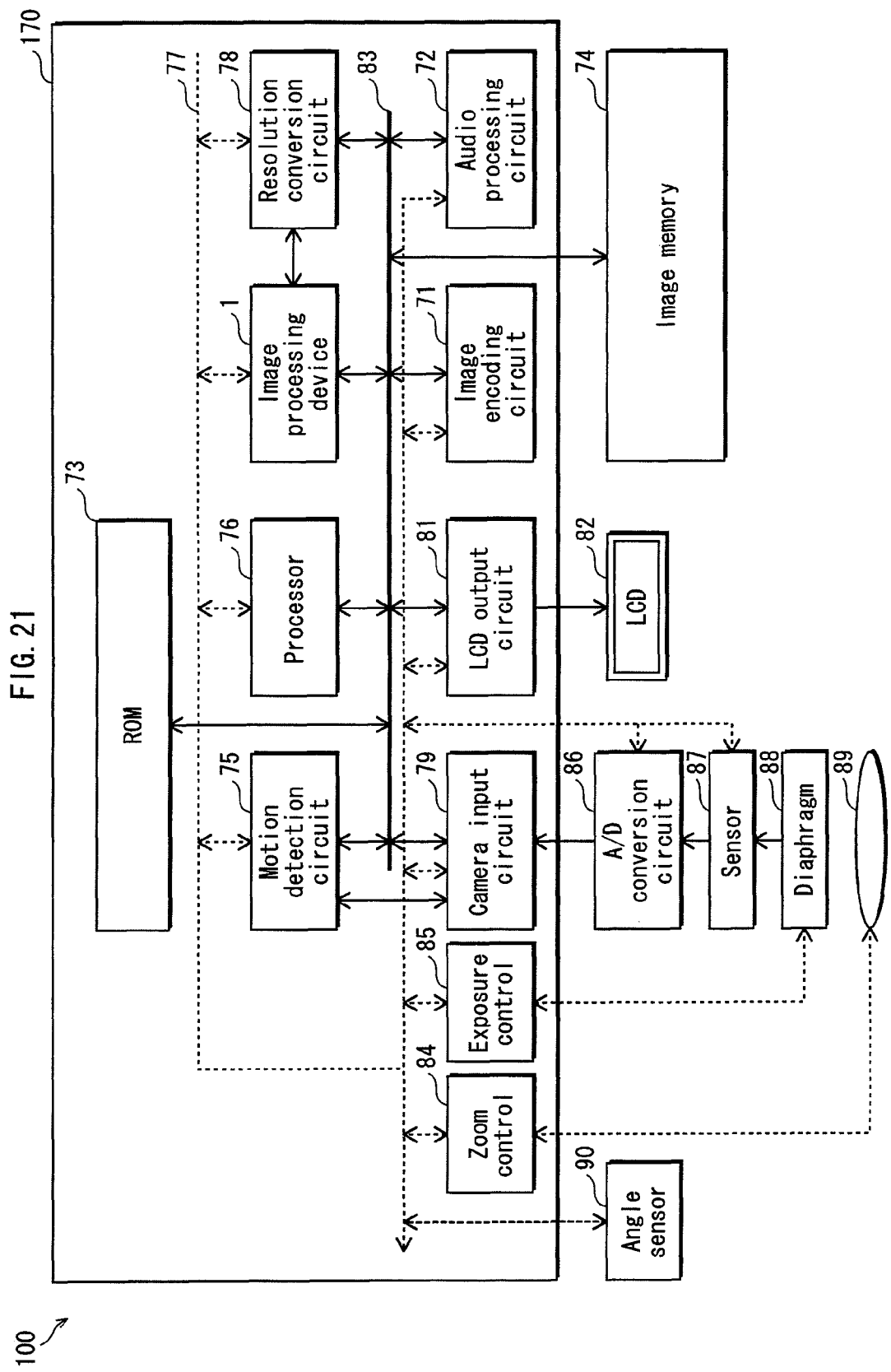
FIG. 21 is a block diagram showing a structure of an imaging device 100.
Figure 22A:
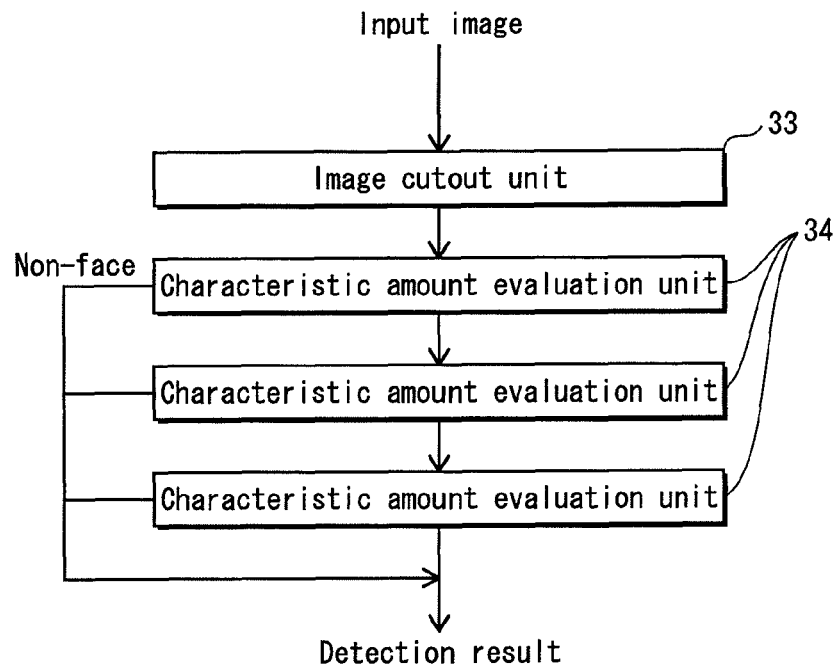
FIG. 22A is a reference drawing showing a conventional image processing device.
Figure 22B:
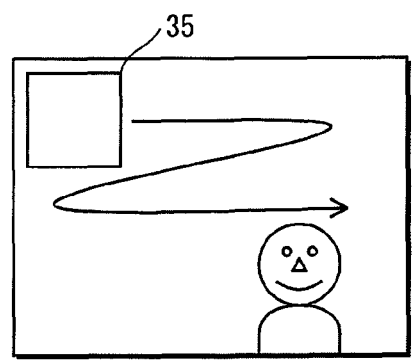
FIG. 22B is a reference drawing showing an order of scanning by using a search window pertaining to face detection.

FIG. 21 is a block diagram showing embodiment 3 of the present invention.

An imaging device 100 includes a semiconductor integrated circuit 170, a lens 89, a diaphragm 88, a sensor 87, an A/D conversion circuit 86, and an angle sensor 90.

The lens 89 is for imaging an object. Specifically, the lens 89 includes a zoom lens for realizing a zoom function and a focus lens for focusing on the object.

The diaphragm 88 includes a mechanical shutter, a diaphragm for adjusting brightness of the object, a filter, and the like. The diaphragm 88 realizes functions of a shutter, diaphragm, and the like.

The sensor 87 includes a CCD (Charge Coupled Device), a CMOS (Complementary Metal Oxide Semiconductor), and the like. The sensor 87 converts an object image imaged by the lens 89 into an electric signal, generates analog image data, and outputs the analog image data to the A/D conversion circuit 86.

The A/D conversion circuit 86 performs gain adjustment and A/D (analog/digital) conversion for analog data output from the sensor 87, and outputs image data as digital data.

The semiconductor integrated circuit 170 includes a zoom control 84 for controlling the lens 89 and an exposure control 85 for controlling the diaphragm 88 in addition to elements included in the semiconductor integrated circuit 70 in embodiment 2.

The angle sensor 90 detects a shooting angle of the imaging device 100. The angle sensor 90 outputs, to the angle set unit 10, change information showing an angle to be set based on the detected shooting angle.

Here, as shown in FIGS. 16A to 16D, when the detected shooting angle is ±α degrees (e.g. ±45 degrees), the angle sensor 90 outputs an angle set signal showing an angle 0 degrees to the angle set unit 10. When the shooting angle is within 45 to 135 degrees, or within −225 to −315 degrees based on a standard angle 0 degrees, the angle sensor 90 outputs an angle set signal showing an angle 90 degrees to the angle set unit 10. When the shooting angle is within 135 to 225 degrees, or within −135 to −225 degrees based on the standard angle 0 degrees, the angle sensor 90 outputs an angle set signal showing a reverse angle to the angle set unit 10. When the shooting angle is within 225 to 315 degrees, or within −45 to −135 degrees based on the standard angle 0 degrees, the angle sensor 90 outputs an angle set signal showing an angle 270 degrees to the angle set unit 10.

Although the angle sensor 90 outputs the angle set signal to the angle set unit 10 here, but it is not limited to this. The angle sensor 90 may only detect the shooting angle of the imaging device 100, and the processor 76 may output the angle set signal to the angle set unit 10 based on a detection result of the angle sensor 90.

By using positional information of a face detected by the image processing device 1 included in the semiconductor integrated circuit 170, the zoom control 84 can perform focus control and the exposure control 85 can perform exposure control by adjusting a focus to a face position. Accordingly, the imaging device 100 which can shoot a face clearly can be realized.

In this embodiment, the imaging device 100 is described to include the angle sensor 90, and switch the selector tables and the address conversion tables to be used by the angle set unit 10 based on a detection result of the angle sensor 90, it is not limited to this. For example, the imaging device 100 may not include the angle sensor 90. In this case, as shown in embodiment 2, the processor 76 outputs change information to the angle set unit 10 such that the selector tables and the address conversion tables are switched from an angle 0 degrees to 90 degrees, reverse, and 270 degrees, in this order, until the classifier 7 judges that a face appears. Note that, as described in embodiment 2, the processor 76 inhibits face detection processing for a window targeted for the detection when a face is not detected for all angles.

4. Modifications

Although the present invention has been explained in accordance with the above embodiments 1 to 3 and the above modification, it is obvious that the present invention is not limited to the above embodiments and modification. The following modifications are also included in the present invention.

(1) The processing control unit 19 in embodiment 1 and the processor 76 in embodiment 2 are described to output change information to the angle set unit 10 such that the selector tables and the address conversion tables are switched until a face is detected, or until face detection processing for all angles is performed, when the image processing device 1 performs face detection processing, but it is not limited to this. Hereinafter, such operation is referred to as a first operation.

As shown in embodiment 3, the angle sensor, or the processing control unit 19 (the processor 76) based on a detection result of the angle sensor may output change information to the angle set unit 10 such that the selector tables and the address conversion tables are switched. Hereinafter, such operation is referred to as a second operation.

Alternately, switching between tables using both of the first and second operation may be performed. In this case, a selector table and an address conversion table which is enabled based on a shooting angle detected by the angle sensor are used as tables to be used firstly in face detection, and selector tables and address conversion tables are sequentially switched until a face is detected. For example, the selector table and the address conversion table corresponding to an angle 90 degrees are used as tables to be used firstly in face detection, selector tables and address conversion tables corresponding to an reverse angle, an angle 270 degrees, and 0 degrees are sequentially switched until a face is detected.

Also, switching between tables using both of the first and second operation may be performed in embodiment 3.

(2) The present invention may be realized by software.

(3) Part or all of elements constituting the above image processing device may include an IC card attachable/detachable to/from each device or a single module. The IC card and the module are computer systems composed of a microprocessor, a ROM, a RAM, and the like. The IC card and the module may include the above ultra-multifunctional LSI. As the microprocessor operates in accordance with a computer program, the IC card and the module achieve its functions. The IC card and the module may be tamper resistant.

(4) Part or all of elements constituting the above image processing device may include one system LSI (Large Scale Integration). The system LSI is an ultra-multifunctional LSI produced by integrating a plurality of components on one chip. Specifically, the system LSI is a computer system including a microprocessor, a ROM, a RAM, and the like. A computer program is stored in the RAM. As the microprocessor operates in accordance with the computer program, the system LSI achieves its function.

Each element constituting the above devices may be achieved on one chip, or part or all thereof may be achieved on one chip.

Although a system LSI is taken for an example here, it may be called as IC, LSI, super LSI, and ultra LSI, depending on a difference in integration degree. Also, the integrated circuit is not limited to the LSI, and it may be realized by a dedicated communication circuit or a general-purpose processor. It may be realized by FPGA (Field Programmable Gate Array) operable to program after production of a LSI, or a reconfigurable processor operable to reconfigure a connection or a setup of a circuit cell inside the LSI.

And further, if a technology of an integrated circuit replacing a LSI comes out by a progress of a semiconductor technology or other derivative technology thereof, naturally the technology may be used for integration of functional blocks. Biotechnology and the like may be applied to this kind of technology.

(5) The present invention may be the above-mentioned method. Alternately, the present invention may be a computer program by which a computer achieves the above-mentioned method, a digital signal including the computer program.

Also, the present invention may be a computer-readable recording medium like a flexible disk, hard disc, CD-ROM, MO, DVD, DVD-ROM, DVD-RAM, BD (Blu-ray Disc), and semiconductor memory, recorded with the computer program or the digital signal. Alternately, the present invention may be the computer program and the digital signal recorded on these recording media.

Also, the present invention may be implemented by transmitting the computer program or the digital signal via a network represented by an electric communication line, a wireless or a wired communication line, and the internet.

Also, the present invention may be a computer system including a microprocessor and a memory. The above-mentioned computer program may be stored in the memory, and the microprocessor may operate in accordance with the computer program.

Also, other independent computer system may implement the present invention by transferring the recording medium recorded with the computer program or the digital signal, or by transferring the computer program or the digital signal via the network and the like.

(6) The embodiments and the modification may be combined with each other.

5. Summary (1) One aspect of the present invention is an image processing device comprising: an image input unit from which an image is input, a rectangular image cutout unit for cutting out a rectangular image from the image input from the image input unit, a classifier for (i) calculating an amount of characteristic for each of a plurality of rectangular images cut out by the rectangular image cutout unit, (ii) calculating an evaluation value with use of the amount of characteristic, and (iii) identifying whether a target object appears based on the calculated evaluation value, a learning parameter storing unit for storing a learning parameter used by the classifier to calculate the evaluation value for each of the plurality of rectangular images, a learning parameter reference calculation unit for showing a reference of the learning parameter which is required to calculate the evaluation value for each of the plurality of rectangular images, and a switching unit for switching cutout positions of each of the plurality of rectangular images by changing (i) the cutout positions at which each of the plurality of the rectangular images is cut out by the rectangular image cutout unit and (ii) the reference of the learning parameter shown by the learning parameter reference calculation unit in accordance with a rotating angle to be set.

With the above structure, since the image processing device can set a relationship between the rectangular image and the learning parameter for each rotating angle of an input image, face detection processing for each rotated image can be performed without decreasing in face detection speed.

The image processing device can perform face detection processing for each rotated image without decreasing in face detection speed in a face detection method using a plurality of amounts of characteristic.

(2) Here, the rectangular image cutout unit may include a selector table that stores information about a cutout position of pixel data and a selector unit for selecting pixel data input from the image input unit in accordance with the selector table. The cutout position of the rectangular image may be changed by changing the information stored in the selector table.

(3) Here, the switching unit may switch the information about a cutout position of pixel data stored in the selector table.

(4) Here, the learning parameter reference calculation unit may include a learning parameter reference table for storing reference information of the learning parameter which is required to calculate the evaluation value of the rectangular image. The reference information of the learning parameter which is required to calculate the evaluation value of the rectangular image may be changed by changing information stored in the learning parameter reference table.

(5) Here, the reference information of the learning parameter which is required to calculate the evaluation value of the rectangular image stored in the learning parameter reference table may be switched by the switching unit.

(6) Here, the switching unit may set an angle by using an angle of a target object to be identified from an image input from the image input unit.

(7) Here, the cutout position of the rectangular image switched by the switching unit may correspond to a position shown by angle information set by the switching unit based on a cutout position at 0 degrees.

(8) Here, the switching unit may set an angle as 90 degrees, 180 degrees, or 270 degrees.

(9) Here, the learning parameter storing unit may be a ROM.

(10) Here, the reference information of the learning parameter may be an address of the ROM.

(11) Another aspect of the present invention is an image processing method comprising: inputting an image, cutting out a rectangular image from the image input in the image input step, calculating an amount of characteristic for each of a plurality of rectangular images cut out in the rectangular image cutout step, calculating an evaluation value with use of the amount of characteristic, and identifying whether a target object appears based on the calculated evaluation value, storing a learning parameter used in the identification step to calculate the evaluation value for each of the plurality of rectangular images, showing a reference of the learning parameter which is required to calculate the evaluation value for each of the plurality of rectangular images, and switching target objects to be identified in the identification step by changing (i) the cutout positions at which each of the plurality of the rectangular images is cut out in the rectangular image cutout step and (ii) the reference of the learning parameter shown in the learning parameter reference calculation step.

(12) Another aspect of the present invention is a semiconductor integrated circuit comprising: an image input unit from which an image is input, a rectangular image cutout unit for cutting out a rectangular image from the image input from the image input unit, a classifier for (i) calculating an amount of characteristic for each of a plurality of rectangular images cut out by the rectangular image cutout unit, (ii) calculating an evaluation value with use of the amount of characteristic, and (iii) identifying whether a target object appears based on the calculated evaluation value, a learning parameter storing unit for storing a learning parameter used by the classifier to calculate the evaluation value for each of the plurality of rectangular images, a learning parameter reference calculation unit for showing a reference of the learning parameter which is required to calculate the evaluation value for each of the plurality of rectangular images, and a switching unit for switching cutout positions of each of the plurality of rectangular images by changing (i) the cutout positions at which each of the plurality of the rectangular images is cut out by the rectangular image cutout unit and (ii) the reference of the learning parameter shown by the learning parameter reference calculation unit.

(13) Yet another aspect of the present invention is an imaging device comprising: an image input unit from which an image is input, a rectangular image cutout unit for cutting out a rectangular image from the image input from the image input unit, a classifier for (i) calculating an amount of characteristic for each of a plurality of rectangular images cut out by the rectangular image cutout unit, (ii) calculating an evaluation value with use of the amount of characteristic, and (iii) identifying whether a target object appears based on the calculated evaluation value, a learning parameter storing unit for storing a learning parameter used by the classifier to calculate the evaluation value for each of the plurality of rectangular images, a learning parameter reference calculation unit for showing a reference of the learning parameter which is required to calculate the evaluation value for each of the plurality of rectangular images, and a switching unit for switching cutout positions of each of the plurality of rectangular images by changing (i) the cutout positions at which each of the plurality of the rectangular images is cut out by the rectangular image cutout unit and (ii) the reference of the learning parameter shown by the learning parameter reference calculation unit.

(14) In the present invention, since a relationship between a position of a rectangular image to be selected and a rectangular area shown by a template frame is described to be variable, an image memory is accessed in the same manner as usual even in the case of a rotated image. This causes, for example, when an image is rotated from FIG. 25A to FIG. 25B, a rectangular area in which matching processing is performed at the same time when matching processing for a rectangular image R_B1 is performed is changed from a rectangular image R_A1 to a rectangular image R_A2. In other words, a rectangular image to be accessed at the same time when the rectangular image R_B1 is accessed is changed from the rectangular image R_A1 to the rectangular image R_A2.

In this way, the present invention can improve efficiency to access an image memory compared with conventional face detection processing for the rotated image.

(15) Generally, since an image memory for storing an image has a large capacity, the image memory is composed of a SRAM. The SRAM is characterized by being high in access efficiency when it is accessed in units of word, and low in access efficiency when it is accessed in units of bit. This is because data of one word can be acquired by one access, whereas data of one column can be acquired by accessing the SRAM a plurality of times. Therefore, the image memory composed of the SRAM has characteristics relating to access efficiency which is the same as that of the SRAM.

Figure 25A:
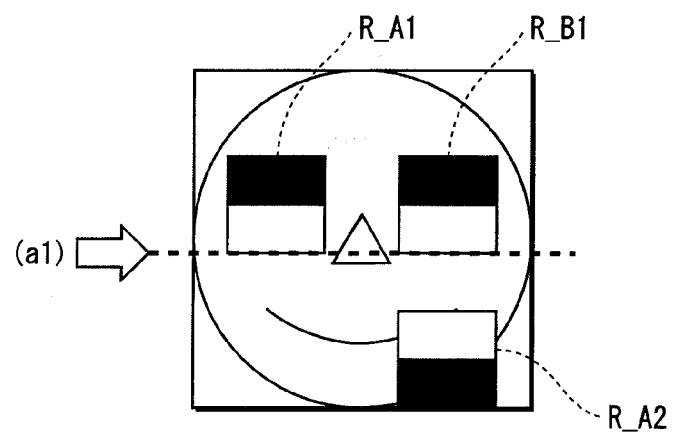
FIG. 25A shows positions of rectangular images to be selected at the normal photographing.
Figure 25B:
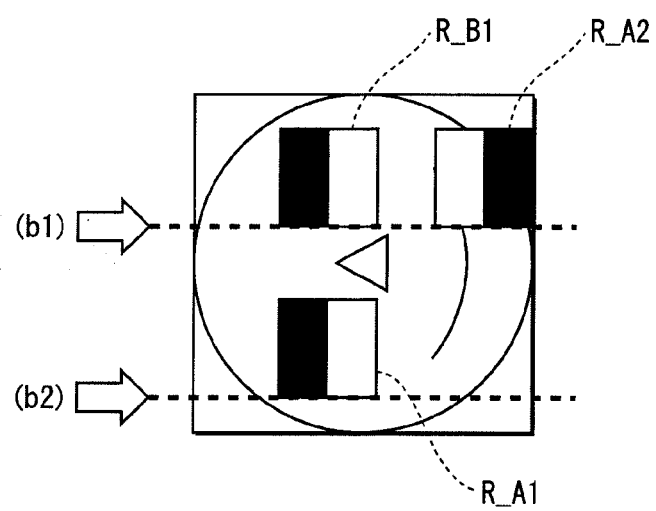
FIG. 25B shows positions of rectangular images to be selected at the vertical photographing.

A large amount of throughput is required to perform face detection processing. In order to complete processing within a predetermined time (e.g. 33 ms, when 30 frames are required to be processed in 1 minute), it is considered that matching processing performed by the face detection unit is performed in parallel. FIGS. 25A and 25B show a storage state of an image which is not targeted for the detection into an image memory. FIG. 25A shows a storage state in the case of a normal image, whereas FIG. 25B shows a storage state in the case of a rotated image. R_A1 is a rectangular area for calculating an amount of characteristic of the right eye, and R_B1 is a rectangular area for calculating an amount of characteristic of the left eye. Also, a vertical direction shows a direction in which words are arranged, whereas a horizontal direction shows a direction in which bits are arranged. For example, pixel data of the rectangular image R_A1 and pixel data of the rectangular image R_B1 in FIG. 25A can be simultaneously acquired by accessing an address (a1). Accordingly, matching processing for the rectangular area R_A1 and R_B1 can be performed in parallel. However, in the case of the rotated image (FIG. 25B), pixel data of the rectangular area R_A1 and pixel data of the rectangular area R_B1 cannot be acquired at the same time. These pieces of pixel data are required to be acquired by sequentially accessing an address (b1) and an address (b2). Also, the matching processing can only be performed sequentially.

By having a selector table and an address conversion table for each rotating angle (0 degrees, 90 degrees, reverse, and 270 degrees) as shown in embodiment 1, a rectangular image which should be selected when the selector circuit read out image of one line, and a parameter which should be used to evaluate the rectangular image can be properly specified. That is to say, face detection for a rotated image can be performed in a face detection method using a plurality of amounts of characteristic.

(16) Here, the image judgment device in the present invention corresponds to the image processing device 1 shown in the above embodiments.

The first storage unit in the present invention corresponds to the ROM 9 in the above embodiments.

The second storage unit in the present invention corresponds to an element composed of the selector table storage unit 12 and the address conversion table storage unit 16 in the above embodiments.

The acquisition unit in the present invention corresponds to the image input unit 2 in the above embodiments.

The selection unit in the present invention corresponds to the angle set unit 10 in the above embodiments.

The extraction processing unit in the present invention corresponds to an element composed of the cutout processing unit 11 and characteristic amount calculation unit 13 in the above embodiments.

The judgment unit in the present invention corresponds to an element composed of the evaluation value calculation unit 14, the judgment unit 15, and the address generation unit 17 in the above embodiments.

The instruction unit in the present invention corresponds to the processing control unit 19 in the above embodiments.

The first placement position table and the second placement position table in the present invention correspond to the selector table in the above embodiments.

The first existence position table and the second existence position table in the present invention correspond to the address conversion table in the above embodiments.

The image processing device in the present invention performs face detection processing for an input image in which a face is rotated, and is useful as a face detection device in a digital camera. Also, the image processing device can be applied to a digital movie, a surveillance camera, and the like.

The present invention can be commercially, that is, repeatedly and continuously used in an industry in which an image processing device, and a digital video camera and digital camera including the image processing device are manufactured and sold.

The invention claimed is:

1. An image judgment device for judging whether or not a characteristic part of an object appears in an image frame to be shot, the characteristic part being a distinguishing aspect of the object and having a plurality of specific elements, the judgment being made by using the specific elements, the image judgment device comprising:

a first storage unit that stores element characteristic information regarding a sample object in an upright position, the element characteristic information showing characteristics of each of a plurality of specific elements that a characteristic part of the sample object has;

a second storage unit that stores first positional information and second positional information, the first positional information defining a position of each of a plurality of specific elements on a specific coordinate system when a standard object is in the same position as the sample object, the second positional information defining a position of each of the specific elements on the specific coordinate system when the standard object has been rotated from the upright position, the standard object having a characteristic part on which each of the specific elements is placed;

an acquisition unit operable to acquire the image frame;

a selection unit operable to select either the first positional information or the second positional information;

an extraction processing unit operable to (i) apply the specific coordinate system to the image frame, (ii) when the first positional information is selected, acquire a partial image that is in the image frame and considered as an element specified by the first positional information, and acquire image characteristic information by extracting pixel values of the partial image in an order based on a first axis on the specific coordinate system, and (iii) when the second positional information is selected, acquire a partial image that is in the image frame and considered as an element specified by the second positional information, and acquire image characteristic information by extracting pixel values of the partial image in an order based on a second axis, the second axis being acquired by rotating the first axis in a direction the object is rotated, the order being based on the first axis being relatively the same as the order based on the second axis; and a judgment unit operable to (i) specify the element characteristic information for a specific element at a position corresponding to a position of the partial image on the specific coordinate system, (ii) evaluate, for the specific element, the partial image with use of the specified element characteristic information and the acquired image characteristic information, and (iii) judge whether or not the characteristic part having the specific element appears in the image frame.

2. The image judgment device in claim 1, wherein
the extraction processing unit, (i) when the first axis is used, separates a first partial image that is considered as the element specified by the first positional information into a plurality of areas in a predetermined separation method at a position based on a direction along the first axis, defines one of the plurality of separated areas as a base area, and acquires the image characteristic information for the first partial image by sequentially scanning, starting from the base area, the plurality of areas in a scanning direction that is the same as the direction along the first axis, and (ii) when the second axis is used, separates a second partial image that is considered as the element specified by the second positional information into a plurality of areas in the predetermined separation method based on a direction along the second axis, and acquires the image characteristic information for the second partial image by sequentially scanning, starting from an area that is relatively at the same position as the base area, the plurality of areas in a scanning direction that is the same as the direction along the second axis so that a scanning order based on the first axis being relatively the same as a scanning order based on the second axis.

3. The image judgment device in claim 1, wherein
the acquisition unit applies a frame surrounding the characteristic part of the standard object to the image frame, and acquires a judgment image surrounded by the frame from the image frame, the extraction processing unit acquires a partial image that is in the judgment image and considered as an element specified by selected positional information, and acquires image characteristic information for the partial image, and the judgment unit (i) evaluates, for the specific element, the partial image with use of the specified element characteristic information and the acquired image characteristic information, and (ii) judges whether or not the characteristic part appears in the judgment image.

4. The image judgment device in claim 3 further comprising:

an instruction unit operable to, when the judgment unit judges that the characteristic part does not appear in the judgment image, instruct the selection unit to select another piece of positional information which has not been selected, wherein the selection unit selects the other piece of positional information which has not been selected upon receiving the instruction, the extraction processing unit acquires another partial image that is considered as an element specified by the selected other piece of positional information, and acquires image characteristic information by extracting pixel values of the other partial image in an order based on an axis corresponding to the selected other piece of positional information, and the judgment unit (i) specifies the element characteristic information for a specific element at a position corresponding to a position of the other partial image on the specific coordinate system, (ii) evaluates, for the specific element, the other partial image with use of the specified element characteristic information and the acquired image characteristic information, and (iii) judges whether or not the characteristic part appears in the image frame.

5. The image judgment device in claim 3, wherein
the extraction processing unit comprising:

an image read sub-unit that has an area in which line images of predetermined lines in the judgment image are stored, and operable to (i) sequentially read a line image of a line from the judgment image, (ii) sequentially store the read line image in the area, and (iii) discard, from the area, a line image having been read first when the number of the stored line images exceeds the number of the predetermined lines; and an extraction sub-unit operable to, each time the image read sub-unit reads and stores the line image, (i) acquire all partial images that are in the line images stored in the image read sub-unit and considered as elements specified by selected positional information, and (ii) acquire image characteristic information for all the acquired partial images, and the judgment unit comprising:

a specification sub-unit operable to, each time the extraction sub-unit acquires the partial image, specify element characteristic information for the partial image; and a judgment sub-unit operable to judge whether or not the characteristic part appears in the judgment image with use of the acquired image characteristic information and the specified element characteristic information for all the acquired partial images.

6. The image judgment device in claim 5, wherein
the first positional information is shown in a first placement position table indicating a placement position of each of the specific elements that the characteristic part of the standard object has on the specific coordinate system when the standard object is in the same position as the sample object,
the second positional information is shown in a second placement position table indicating a placement position of each of the specific elements that the characteristic part of the standard object has on the specific coordinate system when the standard object has been rotated from the upright position,
the second storage unit further stores (i) a first existence position table in which the placement position of each of the specific elements when the standard object is in the same position as the sample object is associated with an existence position of the element characteristic information for each of the specific elements in the first storage unit, and (ii) a second existence position table in which the placement position of each of the specific elements when the object has been rotated from the upright position is associated with the existence position of the element characteristic information for each of the specific elements,
the selection unit selects either a pair of the first placement position table and the first existence position table or a pair of the second placement position table and the second existence position table,
the extraction sub-unit acquires the partial image with use of a placement position table included in the pair selected by the selection unit, and
the specification sub-unit specifies the element characteristic information for the partial image with use of positional information having been used to acquire the partial image and an existence position table selected by the selection unit.

7. The image judgment device in claim 6, wherein
shape information showing a shape of a partial image to be acquired is associated with the placement position of each of the specific elements included in each of the first placement position table and the second placement position table,
the extraction sub-unit acquires a partial image that is at the placement position of each of the specific elements from the stored line images, the partial image having a shape shown by the shape information corresponding to the placement position.

8. The image judgment device in claim 6, wherein
the element characteristic information is an evaluation value group composed of evaluation values having been weighted in terms of an approximation to a corresponding specific element,
each amount of characteristic shown by a combination of brightness and darkness in a plurality of areas constituting the partial image is associated with a different sample value,
the existence position included in the existence position table shows a starting position of a corresponding sample value group in the first storage unit,
the extraction sub-unit acquires, as the image characteristic information, the amount of characteristic of the partial image by extracting pixel values of the partial image in an order based on an axis corresponding to the selected positional information,
the specification sub-unit specifies, each time the extraction sub-unit acquires the partial image, a starting position of the evaluation value group with use of the selected existence position table and the placement position having been used to acquire the partial image,
the judgment sub-unit (i) acquires an evaluation value corresponding to the amount of characteristic of the partial image from the evaluation value group shown by the specified starting position, (ii) calculates a weighted value in terms of an approximation to the characteristic part from a total of the acquired evaluation values for all the partial images in the judgment image, and (iii) judges that the characteristic part appears in the judgment image when the calculated weighted value is a predetermined threshold value or more.

9. The image judgment device in claim 6, wherein
the second storage unit further stores, (i) in association with the first placement position table and the first existence position table, a first placement position table use flag and a first existence position table use flag, respectively, showing whether or not each of the tables can be used and, (ii) in association with the second placement position table and the second existence position table, a second placement position table use flag and a second existence position table use flag, respectively, showing whether or not each of the tables can be used,
the selection unit further sets a value for a placement position table use flag and an existence position table use flag corresponding to a pair of the placement position table and the existence position table to be selected, the value showing that the corresponding placement position table and existence position table are permitted to be used,
the extraction sub-unit uses the placement position table for which the value showing that the placement position table is permitted to be used is set to acquire the partial image, and
the specification sub-unit uses the existence position table for which the value showing that the existence position table is permitted to be used is set to specify the element characteristic information.

10. The image judgment device in claim 6, wherein
the second storage unit has a referable area and a non-referable area,
the selection unit stores a pair of the placement position table and the existence position table to be selected in the referable area, and the other pairs of the placement position table and the existence position table in the non-referable area,
the extraction sub-unit uses the placement position table stored in the referable area to acquire the partial image, and
the specification sub-unit uses the existence position table stored in the referable area to specify the element characteristic information.

11. The image judgment device in claim 6, wherein
an access right is associated with each of the first placement position table, the second placement position table, the first existence position table, and the second existence position table, the access right showing whether or not each of the tables can be accessed,
the selection unit sets (i) an access right for a pair of the placement position table and the existence position table to be selected, the access right showing that the corresponding placement position table and existence position table are permitted to be accessed, and (ii) an access right for pairs of the other placement position tables and existence position tables, the access right showing that the corresponding placement position tables and existence position tables are not permitted to be accessed, the extraction sub-unit uses the placement position table for which the access right showing the placement position table is permitted to be accessed is set to acquire the partial image, and the specification sub-unit uses the existence position table for which the access right showing the existence position table is permitted to be accessed is set to specify the element characteristic information.

12. The image judgment device in claim 1, wherein
the selection unit receives an instruction to select either the first or second positional information from the outside, and selects positional information shown by the received instruction.

13. The image judgment device in claim 1, wherein
the object is rotated 90 degrees, 180 degrees, 270 degrees, or reversed.

14. The image judgment device in claim 1, wherein
the object is a person, and
the characteristic part is a face.

15. The image judgment device in claim 1 is included in an imaging device shooting the object.

16. An image judgment method that is used in an image judgment device for judging whether or not a characteristic part of an object appears in an image frame to be shot, the characteristic part being a distinguishing aspect of the object and having a plurality of specific elements, the judgment being made by using the specific elements, the image judgment device including:

a first storage unit that stores element characteristic information regarding a sample object in an upright position, the element characteristic information showing characteristics of each of a plurality of specific elements that a characteristic part of the sample object has;

a second storage unit that stores first positional information and second positional information, the first positional information defining a position of each of a plurality of specific elements on a specific coordinate system when a standard object is in the same position as the sample object, the second positional information defining a position of each of the specific elements on the specific coordinate system when the standard object has been rotated from the upright position, the standard object having a characteristic part on which each of the specific elements is placed, and the image judgment method comprising the steps of:
acquiring the image frame;
selecting either the first positional information or the second positional information;
(i) applying the specific coordinate system to the image frame, (ii) when the first positional information is selected, acquiring a partial image that is in the image frame and considered as an element specified by the first positional information, and acquiring image characteristic information by extracting pixel values of the partial image in an order based on a first axis on the specific coordinate system, and (iii) when the second positional information is selected, acquiring a partial image that is in the image frame and considered as an element specified by the second positional information, and acquiring image characteristic information by extracting pixel values of the partial image in an order based on a second axis, the second axis being acquired by rotating the first axis in a direction the object is rotated, the order based on the first axis being relatively the same as the order based on the second axis; and (i) specifying the element characteristic information for a specific element at a position corresponding to a position of the partial image on the specific coordinate system, (ii) evaluating, for the specific element, the partial image with use of the specified element characteristic information and the acquired image characteristic information, and (iii) judging whether or not the characteristic part having the specific element appears in the image frame.

17. An integrated circuit that is used in an image judgment device for judging whether or not a characteristic part of an object appears in an image frame to be shot, the characteristic part being a distinguishing aspect of the object and having a plurality of specific elements, the judgment being made by using the specific elements, the integrated circuit comprising:

a first storage unit that stores element characteristic information regarding a sample object in an upright position, the element characteristic information showing characteristics of each of a plurality of specific elements that a characteristic part of the sample object has;

a second storage unit that stores first positional information and second positional information, the first positional information defining a position of each of a plurality of specific elements on a specific coordinate system when a standard object is in the same position as the sample object, the second positional information defining a position of each of the specific elements on the specific coordinate system when the standard object has been rotated from the upright position, the standard object having a characteristic part on which each of the specific elements is placed;

an acquisition unit operable to acquire the image frame;

a selection unit operable to select either the first positional information or the second positional information;

an extraction processing unit operable to (i) apply the specific coordinate system to the image frame, (ii) when the first positional information is selected, acquire a partial image that is in the image frame and considered as an element specified by the first positional information, and acquire image characteristic information by extracting pixel values of the partial image in an order based on a first axis on the specific coordinate system, and (iii) when the second positional information is selected, acquire a partial image that is in the image frame and considered as an element specified by the second positional information, and acquire image characteristic information by extracting pixel values of the partial image in an order based on a second axis, the second axis being acquired by rotating the first axis in a direction the object is rotated, the order based on the first axis being relatively the same as the order based on the second axis; and a judgment unit operable to (i) specify the element characteristic information for a specific element at a position corresponding to a position of the partial image on the specific coordinate system, (ii) evaluate, for the specific element, the partial image with use of the specified element characteristic information and the acquired image characteristic information, and (iii) judge whether or not the characteristic part having the specific element appears in the image frame.

* * * * *